(12) United States Patent
Alexander et al.

(10) Patent No.: US 11,516,973 B2
(45) Date of Patent: Dec. 6, 2022

(54) METHOD FOR AUTOMATICALLY REDISTRIBUTING PLANTS THROUGHOUT AN AGRICULTURAL FACILITY

(71) Applicant: Iron Ox, Inc., San Carlos, CA (US)

(72) Inventors: Brandon Ace Alexander, San Francisco, CA (US); Jonathan Binney, San Carlos, CA (US)

(73) Assignee: IRON OX, INC., San Francisco, CA (US)

( * ) Notice: Subject to any disclaimer, the term of this patent is extended or adjusted under 35 U.S.C. 154(b) by 219 days.

(21) Appl. No.: 16/898,785

(22) Filed: Jun. 11, 2020

(65) Prior Publication Data

US 2020/0296902 A1    Sep. 24, 2020

Related U.S. Application Data

(63) Continuation of application No. 15/872,299, filed on Jan. 16, 2018, now Pat. No. 10,716,265.

(Continued)

(51) Int. Cl.
*G06F 7/00* (2006.01)
*A01G 9/029* (2018.01)
(Continued)

(52) U.S. Cl.
CPC .......... *A01G 9/0299* (2018.02); *A01G 31/042* (2013.01); *B25J 5/02* (2013.01);
(Continued)

(58) Field of Classification Search
CPC ....... A01G 9/0299; A01G 31/042; B25J 5/02; B25J 9/0093; B25J 9/1697; B25J 13/08; B25J 19/023; B65H 29/12; G06F 7/00
(Continued)

(56) References Cited

U.S. PATENT DOCUMENTS 5,054,831 A    10/1991  Ting et al.
6,327,986 B1   12/2001  Williames
(Continued)

FOREIGN PATENT DOCUMENTS

CN    101406150 A    4/2009
CN    103213128 A    7/2013
(Continued)

OTHER PUBLICATIONS

Extended European Search Report received in EP 17883320.8 dated Jun. 26, 2020.
(Continued)

*Primary Examiner* — Yolanda R Cumbess
(74) *Attorney, Agent, or Firm* — Kilpatrick Townsend & Stockton LLP

(57) ABSTRACT

One variation of a method for automatically redistributing plants throughout an agricultural facility includes, at a mobile robotic system: delivering a first module—defining a first array of plant slots at a first density and loaded with a first set of plants in approximately a second growth stage—from a grow area within a facility to a transfer station within the facility; delivering a second module—located within the facility and defining a second array of plant slots at a second density less than the first density—to the transfer station; and following transfer of a first subset of plants from the first array of plant slots in the first module into the second array of plant slots in the second module at the transfer station, delivering the second module to the grow area in the facility.

20 Claims, 7 Drawing Sheets

Related U.S. Application Data

(60) Provisional application No. 62/446,749, filed on Jan. 16, 2017.

(51) Int. Cl.

| | |
|---|---|
| *A01G 31/04* | (2006.01) |
| *B25J 19/02* | (2006.01) |
| *B25J 9/16* | (2006.01) |
| *B25J 13/08* | (2006.01) |
| *B25J 9/00* | (2006.01) |
| *B65H 29/12* | (2006.01) |
| *B25J 5/02* | (2006.01) |

(52) U.S. Cl.
CPC .......... *B25J 9/0093* (2013.01); *B25J 9/1697* (2013.01); *B25J 13/08* (2013.01); *B25J 19/023* (2013.01); *B65H 29/12* (2013.01); *G06F 7/00* (2013.01)

(58) Field of Classification Search
USPC ................................ 700/213–214, 218, 228
See application file for complete search history.

(56) References Cited

U.S. PATENT DOCUMENTS

| | | |
|---|---|---|
| 2002/0043195 A1 | 4/2002 | Williames |
| 2002/0088173 A1 | 7/2002 | Hessel et al. |
| 2004/0122592 A1 | 6/2004 | Fuessley et al. |
| 2005/0135912 A1 | 6/2005 | Schempf et al. |
| 2006/0213167 A1 | 9/2006 | Koselka et al. |
| 2013/0110341 A1 | 5/2013 | Jones et al. |
| 2013/0333600 A1 | 12/2013 | Struijk et al. |
| 2014/0316557 A1 | 10/2014 | Jones et al. |
| 2016/0050852 A1 | 2/2016 | Lee |
| 2016/0120114 A1 | 5/2016 | Tsutsumi et al. |
| 2017/0223947 A1 | 8/2017 | Gall et al. |
| 2018/0092304 A1 | 4/2018 | Moore |
| 2022/0007589 A1* | 1/2022 | Binney ................. G06T 7/0012 |
| 2022/0007590 A1* | 1/2022 | Alexander ........... G05D 1/0287 |

FOREIGN PATENT DOCUMENTS

| | | |
|---|---|---|
| CN | 105265302 A | 1/2016 |
| CN | 103279760 B | 10/2016 |
| EP | 3557970 A4 | 7/2020 |
| JP | 2012191903 A | 10/2012 |
| NL | 1031686 C2 | 10/2007 |
| WO | 2013186669 A1 | 12/2013 |
| WO | 2015110268 A1 | 7/2015 |
| WO | 2016070196 A1 | 5/2016 |

OTHER PUBLICATIONS

Extended European Search Report received in EP 18728818.6 dated Jun. 26. 2020.
International Search Report received in PCT/US18/13807 dated May 16, 2018.
International Search Report received in PCT/US2017/068224 dated Dec. 22, 2017.
Office Action received in CN 201780087239.9 dated Aug. 26, 2021.
Office Action received in EP 18738818.6 dated Mar. 11, 2021.
Office Action received in U.S. Appl. No. 15/872,299 dated Apr. 29, 2020.

* cited by examiner

METHOD FOR AUTOMATICALLY REDISTRIBUTING PLANTS THROUGHOUT AN AGRICULTURAL FACILITY

CROSS-REFERENCE TO RELATED APPLICATIONS

This Application is a continuation of U.S. patent application Ser. No. 15/872,299, filed on 16 Jan. 2018, which claims the benefit of U.S. Provisional Application No. 62/446,749, filed on 16 Jan. 2017, each of which is incorporated in its entirety by this reference.

This Application is also related to U.S. patent application Ser. No. 15/852,749, filed on 22 Dec. 2017, which is incorporated in its entirety by this reference.

TECHNICAL FIELD

This invention relates generally to the field of agricultural implements and more specifically to a new and useful method for automatically redistributing plants throughout an agricultural facility in the field of agricultural implements.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
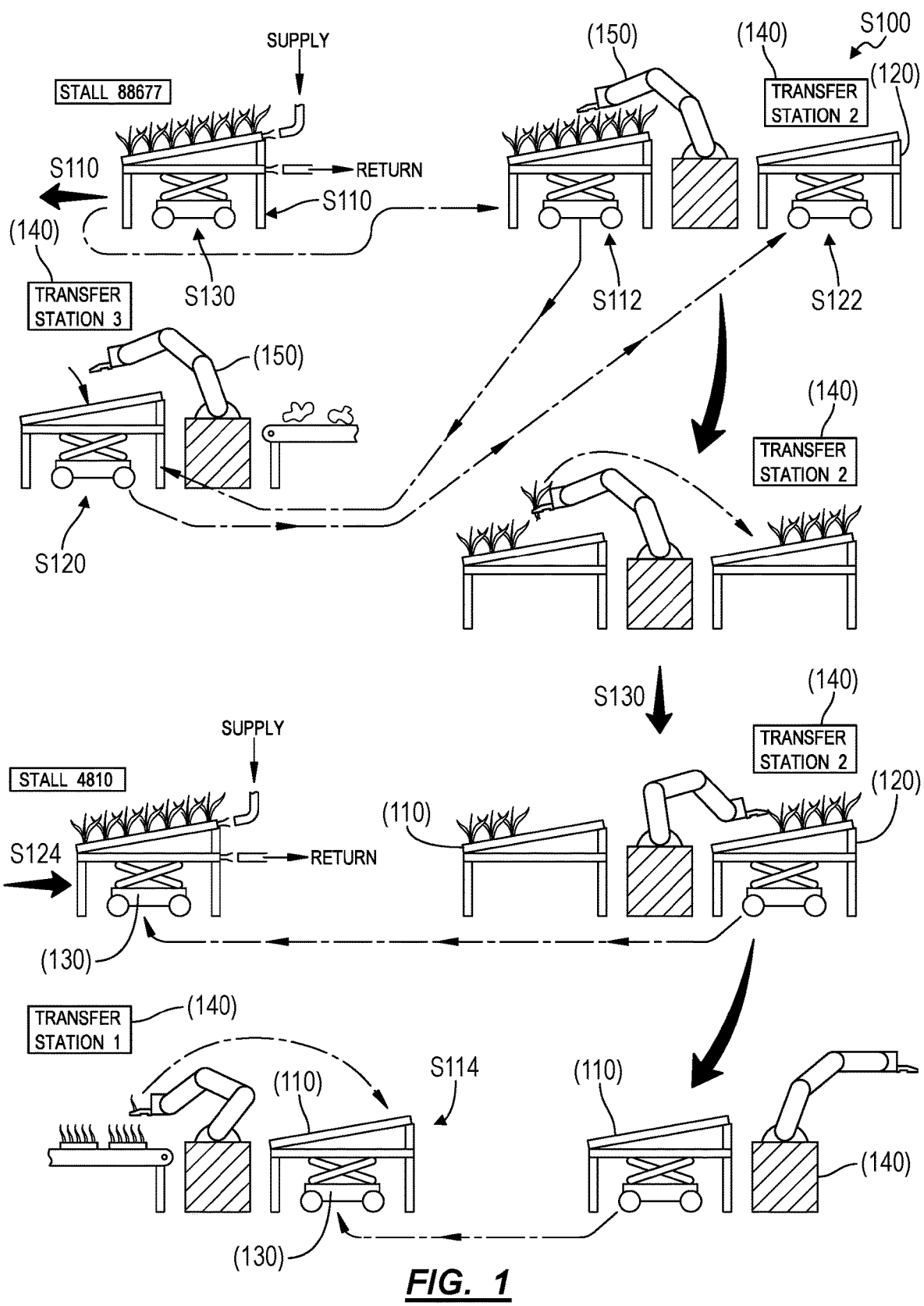
FIG. 1 is a flowchart representation of a method.
Figure 4:
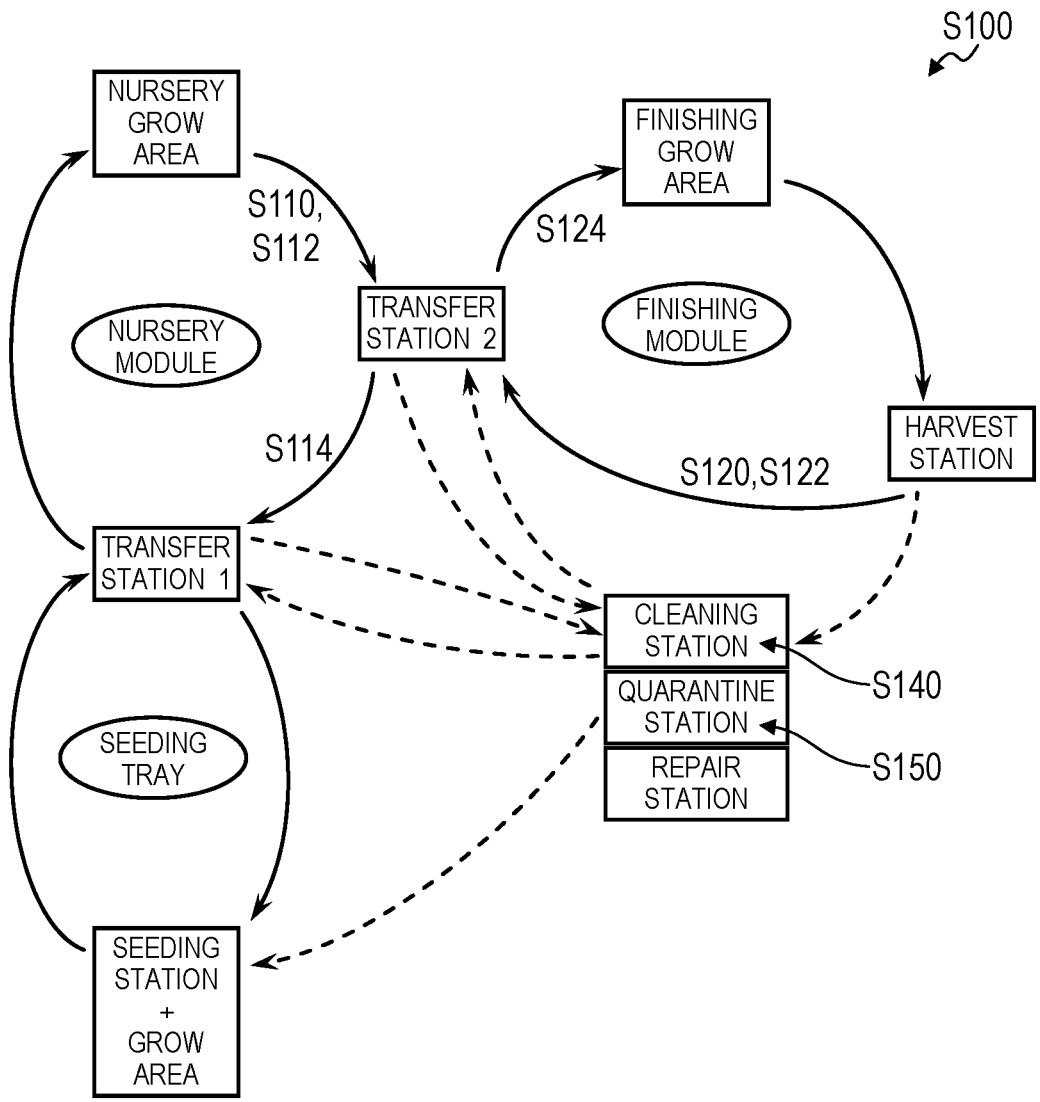
FIG. 4 is a flowchart representation of one variation of the method.

As shown in FIGS. 1 and 4, a method S100 for automatically redistributing plants throughout an agricultural facility includes a set of Blocks executed by a mobile robotic system, including: navigating to a first module located in a grow area within a facility in Block S110, the first module defining a first array of plant slots at a first density and loaded with a first set of plants in approximately a second growth stage; delivering the first module to a first transfer station within the facility in Block S112; navigating to a second module located within the facility in Block S120, the second module defining a second array of plant slots at a second density less than the first density and empty of plants; delivering the second module to the first transfer station in Block S122; following transfer of a first subset of plants, in the first set of plants, from the first array of slots in the first module into the second array of slots in the second module at the first transfer station, delivering the second module to the grow area in the facility in Block S124; and following removal of the first set of plants from the first array of plants slots in the first module and insertion of a second set of plants into the first array of plant slots in the first module, returning the first module to the grow area within the facility, the second set of plants in approximately a first growth stage preceding the second growth stage in Block S114.

2. Applications

Generally, the method S100 can be executed by one autonomous mobile robotic system (hereinafter the "loader") within a greenhouse or other agricultural facility (hereinafter the "facility") to automatically collect and redistribute multiple plant-growing modules to various stations throughout the facility. In particular, the single loader can collect, move, and serially deposit many modules between: a grow location at which water, nutrients, and light are supplied to grow plants in modules; transfer stations at which plants are transferred from an earlier-stage module containing a higher density of plant slots to a later-stage module containing a lower density of plant slots; a cleaning station at which modules are cleaned of plant matter and other detritus; a quarantine station at which modules and their contents are removed from contact with other modules, stations, and operators within the facility; and/or a repair or replace station at which malfunctioning modules are repaired or discarded and at which new or refurbished modules are held; etc., as shown in FIGS. 1-4.

In particular, within the facility, plants may be grown in modules containing a set of hydroponic trays, each of which includes an array of plant slots configured to hold one plant. Young plants (or "sprouts") may have relatively small leaves covering a relatively small area such that these young plants require only a small grow volume; as these plants mature (e.g., to a "sapling" stage or through "thinning" and "rosette" stages), their leaves may grow to cover a greater area, thereby requiring a larger grow volume; as these plants mature further (e.g., through "early-heading," "mid-heading" and "mature-heading" stages), their leaves may develop more fully to cover a greater area up to harvest, thereby necessitating an even larger grow volume. In order to maintain a relatively high throughput per floor area within the facility, the facility can be outfitted with modules of different types—that is, modules with different plant slot densities suited to various stages of plant growth and therefore to various size ranges of plants from seeding to harvest. For example, the facility can be outfitted with: seeding trays defining a highest density of plant slots (e.g., 640 plant slots per 4-foot by 12-foot module or per 1-meter by 4-meter module) and configured to hold plants during a sprout stage; modules of a first type (hereafter a "nursery type") defining a moderate density of plant slots (e.g., 160 plant slots per 4-foot by 12-foot module) and configured to hold plants during a sapling stage; and modules of a second type (hereinafter a "finishing type") defining a lowest density of plant slots (e.g., 40 plant slots per 4-foot by 12-foot module) and configured to hold plants during a finishing stage and up to harvest. By placing young plants first in modules with greatest plant slot densities and then transitioning these plants to modules characterized by lower and lower plant slot densities as the plants increase in size and maturity, the facility can house and grow more plants per module on average and therefore achieve greater space efficiency (i.e., a number of plants per floor area within the facility).

Figure 2:
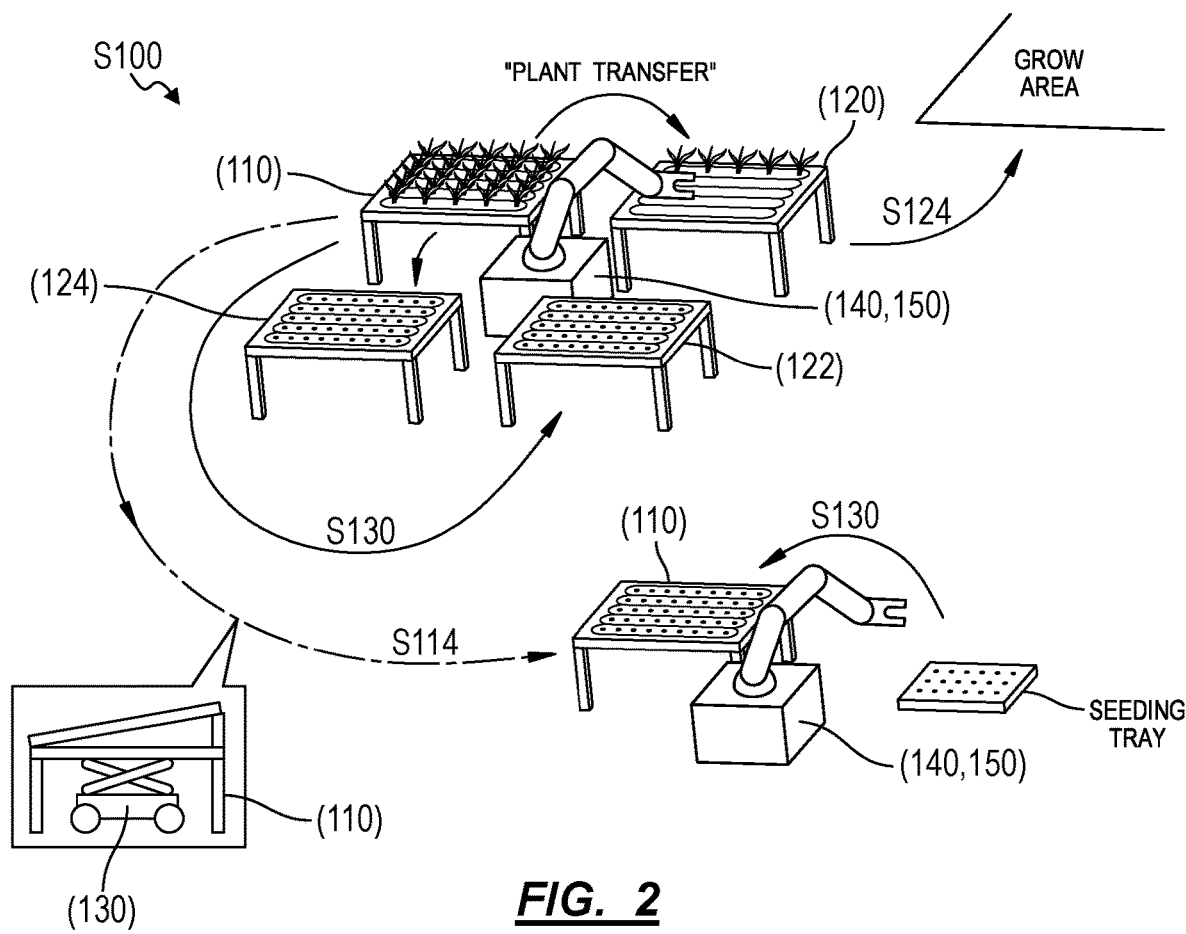
FIG. 2 is a flowchart representation of one variation of the method.
Figure 3:
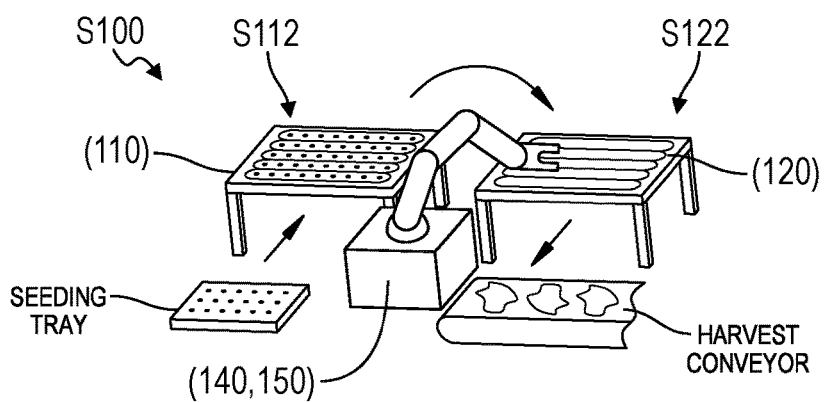
FIG. 3 is a flowchart representation of one variation of the method.

The facility can therefore be outfitted with a robotic arm or other robotic manipulator configured to automatically transfer plants from modules of higher plant slot densities to modules of lower plant slot densities as these plants mature, as shown in FIGS. 1-3. For example, the facility can include a general grow location and a single transfer station containing a single robotic manipulator configured to handle transfer of substantially all plants from seeding trays to nursery modules to finishing modules to harvest trays in the facility; and the loader can transport nursery and finishing modules in similar loops from the grow location to the transfer station and back to the grow location. In another example, the facility can include: stage-specific grow locations, including a seeding grow location distinct from a nursery grow location distinct from a finishing grow location in light type, light frequency, and/or nutrient supply; a seeding-to-nursery transfer station; a nursery-to-finishing transfer station; a finishing-to-harvest transfer station; and a single loader. In this example, the loader can move nursery modules in a nursery loop from the seeding-to-nursery transfer station to the nursery grow location to the nursery-to-finishing transfer station and back to the seeding-to-nursery transfer station. The loader can similarly move finishing modules in a finishing loop from the nursery-to-finishing transfer station to the finishing grow location to the harvest transfer station and back to the nursery to-finishing transfer station.

Therefore, as in the foregoing examples, the loader can automatically redistribute many (e.g., dozens, hundreds, or thousands of) modules throughout the facility in order to enable a single robotic manipulator (or a limited number of robotic manipulators) to automatically: transfer sprouts from a seeding tray—containing plant slots at a first density suitable for plants of this type up to a sapling stage—into a first module of the nursery type containing plant slots at a second density suitable for plants of this type up to an early-heading stage; later transfer early-headed plants from the first module to a second module of the finishing type containing plant slots at a third density suitable for plants of this type up to a fully-matured stage; and finally remove fully-matured plants from the second module for processing, packaging, and distribution from the facility.

3. System

As described above and shown in FIG. 1, Blocks of the method S100 can be executed by a system including: a local or remote computer system 104, such as a remote server; a robotic manipulator 150 (e.g., a robotic arm or a three-axis gantry system) connected to the computer system 104, located at a transfer station within the facility, and outfitted with an end effector 154 configured to retrieve plants from modules; and a loader 130 connected to the computer system 104 and configured to retrieve modules from grow locations throughout the facility 102, to deliver modules to the transfer station 140, and to return modules to their grow locations throughout the facility 102.

In particular, the loader can be configured to automatically navigate throughout the facility to a particular location under or near a module, to couple to or lift the module, to navigate—with the module—to a transfer station within the facility, and to deposit the module at the transfer station.

The system 100 can further include a controller configured to: process data recorded by elements within the system 100; manage and update a map of measured or estimated plant viability, pest pressure, etc. of plants throughout the facility based on these data; maintain a log of locations of individual plants in modules throughout the facility; selectively dispatch the loader to move modules within the facility; and to trigger the robotic manipulator at the transfer station to move plants between modules, harvest containers, etc. based on these data.

In one example, the robotic manipulator is arranged near the center of the transfer station, and the loader can arrange a first module of a nursery type and a second module of a finishing type adjacent the robotic manipulator at the transfer station in order to enable the robotic manipulator to navigate its end effector across both the full extent of plant slots in the first module and the full extent of plant slots in the second module. The loader can also deposit a third module of the finishing type to the transfer station, such as adjacent the second module, and the robotic manipulator can transition to transferring plants from the first module to the third module once all plant slots in the second module are filled. The loader can also deposit a fourth module of the nursery type (e.g., an "extended grow time" module of the nursery type) to the transfer station, and the robotic manipulator can transfer undersized and/or underweight plants removed from the first module into the fourth module to enable the robotic manipulator access to a next plant in the first module, which may be of a sufficient weight for transfer into the second module of the finishing type. Once filled with plants, the loader can then return the second, third, and/or fourth modules to their assigned grow locations within the facility.

In the foregoing example, the loader can additionally or alternatively deliver a seeding tray to the transfer module, and the robotic manipulator can sequentially transfer plants from the seeding tray into the first module before the loader returns the first module to its assigned grow location within the facility, as shown in FIG. 3. Alternatively, the system 100 can include a second robotic manipulator arranged at a second transfer station within the facility; once all plants in the first module are transferred to multiple other modules at the first transfer station, the loader can deliver the first module and the seeding tray to the second transfer station, and the second robotic manipulator can transfer seedlings from the seeding tray into the first module before returning the first module to its assigned grow location within the facility, as shown in FIG. 2.

Similarly, the (first) robotic manipulator at the (first) transfer station, the second robotic manipulator at the second transfer station, or a third robotic manipulator at a third transfer station within the facility can remove plants from the second and third modules of the finishing type (e.g., for manual or automated processing, such as removal of roots) and/or place plants from the second and third modules into packages (e.g., boxes, pallets) for distribution from the facility, as shown in FIG. 4.

The method S100 is described below as executed by the system 100 to automatically: collect full nursery modules and empty finishing modules distributed throughout an agricultural facility (e.g., a greenhouse); deliver these modules to a transfer station at which plants are transferred from the full nursery modules into the empty finishing modules; and to return the full finishing modules to assigned grow locations within the facility. Blocks of the method S100 are also described below as executed generally by the system 100 to redistribute "target modules" of any type throughout the facility. However, the system 100 can implement similar methods and techniques to redistribute seeding trays and/or modules of any other type (i.e., modules defining plant slot densities suitable for any other segments or durations of the grow cycle of a particular plant, plant sub-species, or plant species, etc. grown in the facility) throughout the facility to enable other autonomous processes within the facility.

Furthermore, the method S100 is also described below as executed by the system 100 to automatically redistribute modules containing lettuce in various growth stages throughout the facility. However, the method S100 can be implemented in a greenhouse or other facility in conjunction with growing any other type of plant, such as to grow fruit, vegetables, legumes, flowers, shrubs, or trees, etc.

3.1 Module

Each module in the system 100 is configured to house a group of plants throughout a segment of the growth cycle of these plants (e.g., four weeks of a twelve-week grow-period). Each module can define a standard size (e.g., four feet in width by eight feet in length by four feet in height; two meters in width by five meters in length by one meter in height) and can include a number of plant slots matched to the segment of plant growth cycle associated with the module. For example: a seeding-type module can include 192 plant slots; a nursing-type module can include 48 plant slots (i.e., one-quarter as many as seeding-type modules); and a finishing-type module can include twelve plant slots (i.e., one-quarter as many as nursing-type modules); as shown in FIG. 4, despite these modules defining the same overall size and geometry.

3.1.1 Hydroponic Trays

In one implementation, a module includes: a set of hydroponic trays (or hydroponic tubes), each defining a (linear) array of plant slots, wherein each plant slot is configured to receive and retain one plant (or one cluster of multiple plants); a carriage or frame supporting the set of hydroponic trays at an angle, such as declining 5° from horizontal; a reservoir fluidly coupled to the set of hydroponic trays and configured to collect water flowing out of the hydroponic trays; and a pump configured to cycle water from the reservoir back through the set of hydroponic trays. The module can additionally or alternatively be configured to transiently connect to a water supply line and to a water return line in the facility 102, which can provide a constant supply of water and nutrients to plants in this module. In this implementation, the module can also include: one optical fiducial 114 at the front of each hydroponic tray; optical fiducials 114 at each end of each hydroponic tray; one optical fiducial 114 adjacent each plant slot along each hydroponic tray; or optical fiducials 114 at three or four corners of the modules; etc. The system 100 can thus detect these optical fiducials 114—such as through optical sensors 152 integrated into the loader 130 and into the robotic manipulator 150—to identify and locate the module and to locate plant slots in each hydroponic tray in the module.

3.1.2 Open Tray

Figure 7:
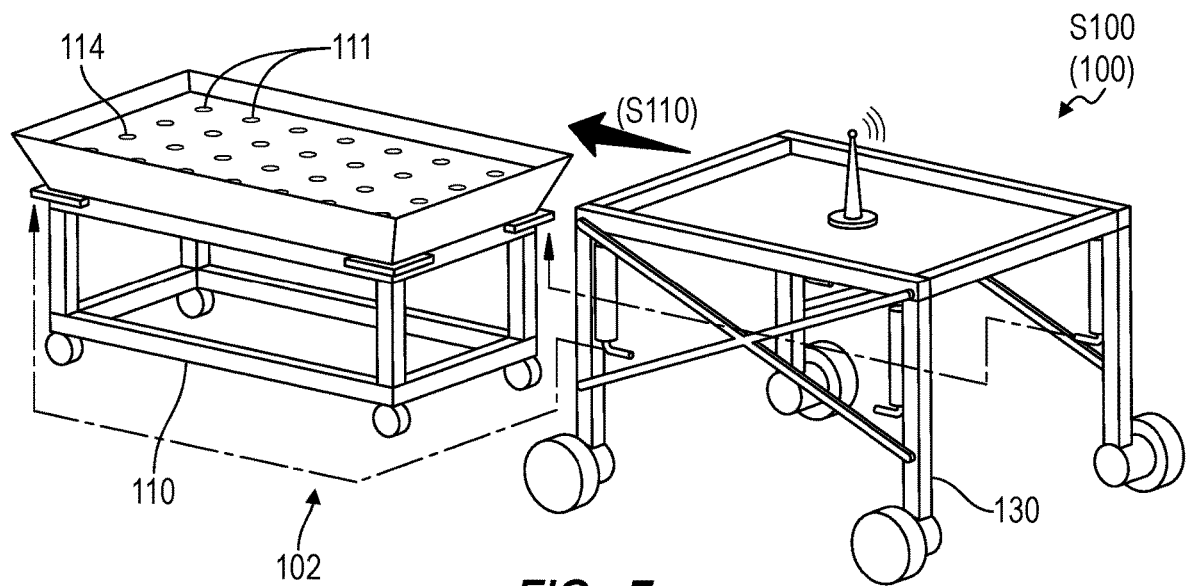
FIG. 7 is a flowchart representation of a system.
Figure 8:
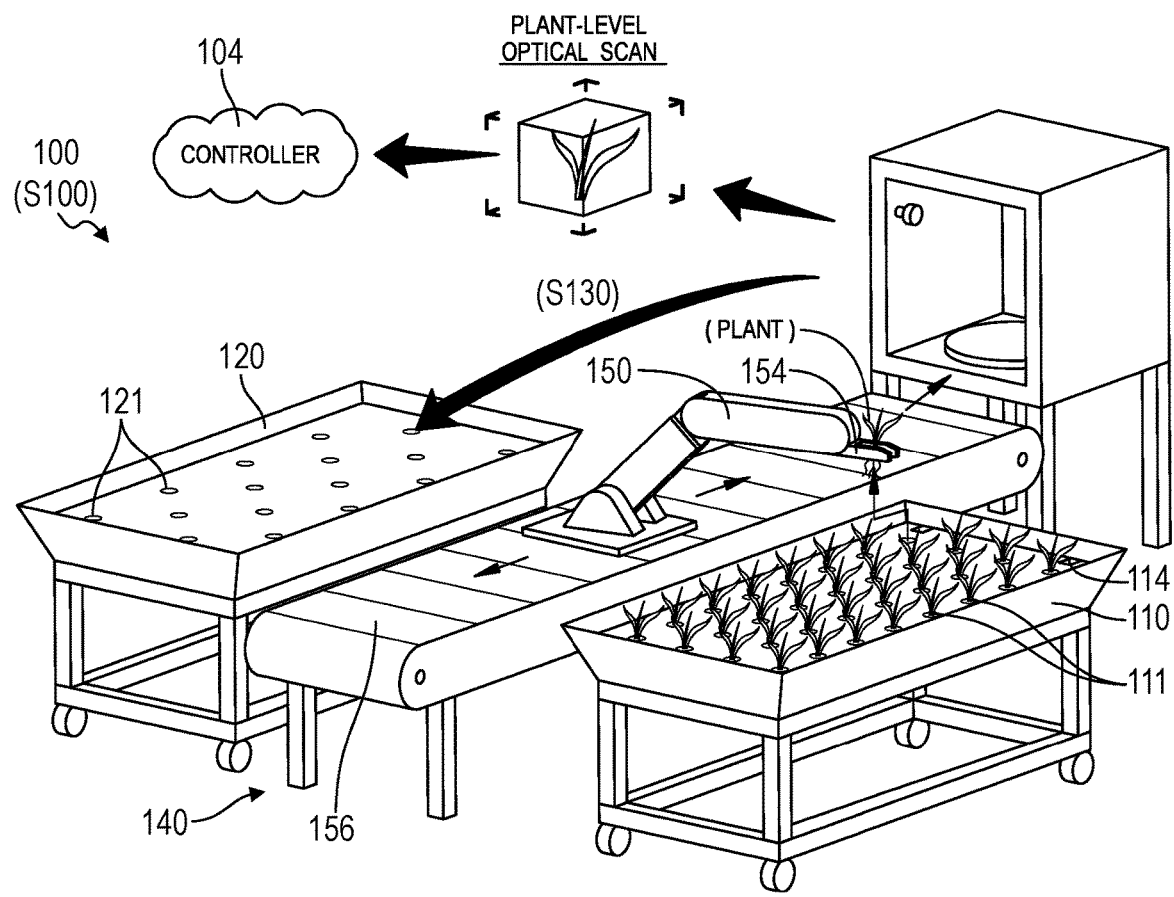
FIG. 8 is a flowchart representation of one variation of the system.

In another implementation shown in FIGS. 7 and 8, a module includes: an open tray configured to contain a standing volume of water and nutrients; a cover arranged over the open tray and including a set of perforations, wherein each perforation defines a plant slot configured to receive and retain one plant (or one cluster of plants); and a stand configured to support the tray off of the ground. In the implementation: the open tray can define a standard rectangular geometry, as described above; and the lid can include a rectangular cover configured to float in water in the tray. For example, the lid can include: a rigid panel (e.g., nylon or aluminum sheet) defining an array (e.g., a linear grid array, a close-pack array) of plant slots; and floats extending across the underside of the rigid panel and exhibiting sufficient buoyancy and/or height to maintain an air gap between the top surface of water in the tray and the bottom surface of the lid when the array of plant slots in the lid are filled with plants, thereby maintaining exposure to air—and therefore oxygen—for upper root systems of these plants. Furthermore, in this example, because the lid floats on the water in the tray, the lid can ensure that roots of these plants remain in contact with water in the tray despite changes to the water level in the tray.

Furthermore, in this implementation, the module can include a set of optical fiducials 114 arranged on the top surface of the lid and/or the tray and configured to indicate position, orientation, distance, type, and/or unique identity of the module. For example, the module can include: one optical fiducial 114 (e.g., a unique barcode or quick-response code) arranged at each of three or four corners on the lid; three (identical) colored dots (e.g., yellow for nursery stage, red for finishing stage) arranged at corners of the lid or tray; or one optical fiducial 114 adjacent each plant slot on the lid (e.g., a colored circle, square, or polygon of known geometry and dimension encircling each plant slot); etc.

Alternatively, the module can include an open tray with a fixed lid. In this implementation, the tray and fixed lid can define geometries and features similar to those in the foregoing implementation but with the lid fixedly coupled to the rim of the tray, such as sealed against the rim of the tray to prevent water from splashing out of the tray when the module is moved by the loader 130.

3.1.3 External Fluid Supply and Return

In one variation shown in FIG. 1, a module includes: an inlet manifold fluidly coupled to the inlet ends of its tray and defining an inlet coupler configured to transiently connect to an external fluid supply line integrated into the facility; and an outlet manifold fluidly coupled to the outlet ends of these tray and defining an outlet coupler configured to transiently connect to an external fluid return line integrated into the facility. For example, the inlet coupler can define an inlet plug configured to engage and seal around a supply socket fluidly coupled to a main fluid supply in the facility; and the outlet coupler can extend from the outlet side of the hydroponic tray back toward the inlet side of the hydroponic tray and terminate at an outlet plug directly under the inlet plug, wherein the outlet plug is configured to engage and seal around a return socket fluidly coupled to a main fluid return in the facility. A central pump within the facility can pump fluid (e.g., water with dissolved nutrients) from a central reservoir through the main fluid supply, which can include a supply socket at each module stall in the grow location within the facility; and the main fluid return can include a return socket adjacent each supply socket and can return fluid to the central reservoir. Therefore, the central pump can distribute fluid to modules connected to the main fluid supply via supply sockets, and fluid passing through these modules can be returned to the reservoir and then the central pump via return sockets and the main fluid return.

In this variation, when collecting a module from a stall in the grow location, the loader can shift a module laterally away from supply and return sockets to disengage the module from the main fluid supply and return before lifting the module and delivering the module to a transfer station, as described below and shown in FIG. 1. Each supply socket can also include a valve, and the loader or computer system 104 can close the valve prior to removal of a module from this stall. For example, one minute prior to the anticipated arrival of the loader at a particular stall, the computer system 104 can transmit a command to close a valve in the supply socket at this particular stall. In this example, fluid remaining in a particular module currently occupying the particular stall can continue to drain into the main fluid return until the loader removes the particular module from the particular stall. Alternatively, the computer system 104 can implement similar methods to trigger a valve in the outlet socket of the particular module to close prior to removal of the particular module from the particular stall in order to prevent fluid remaining in the particular module from leaking onto the floor of the facility.

However, in this variation, a module can be of any other form, can include any other type and number of tray, and can be configured to transiently connect to a main fluid supply and a main fluid return in the facility.

3.1.4 Integrated Fluid Supply and Return

In another variation, each module includes: an integrated fluid reservoir configured to receive fluid from outlet ends of its tray; and an integrated pump configured to pump fluid from the reservoir into inlet ends of the tray. In this variation, each module can also include a nutrient reservoir, nutrient and pH sensors configured to track fluid quality, and a controller configured to trigger the nutrient reservoir(s) to dispense nutrients into the reservoir as needed to maintain target nutrient and pH levels. A module can thus include its own closed fluid loop.

In this variation, a module can also include: a wireless communication module configured to transmit state, water temperature, water flow, nutrient, and/or other data collected at the module back to the computer system 104; and a battery configured to power the controller, pump, wireless communication module, and various other sensors and actuators within the module. The module can additionally or alternatively include an electrical plug configured to engage an electrical socket arranged at a stall within the facility; the module can thus recharge the battery or supply power directly to the controller, pump, wireless communication module, and various other sensors and actuators within the module via an electrical socket when occupying a stall in the facility; and the loader can navigate the module out of the stall according to a trajectory that disengages the electrical plug from the electrical socket in a stall when removing the module from the stall, and vice versa. Yet alternatively, the module can include a solar panel arranged under and/or adjacent its tray and configured to recharge the battery from natural and/or artificial light reaching the module when occupying a stall in a grow location within the facility.

However, in this variation, a module: can be of any other form; can include any other type and number of sensor, actuators, and power systems; and can be configured to transiently connect to a main power or control system within the facility.

3.1.5 Frame

The frame supporting the hydroponic tubes or tray can include a set of hard points that the loader 130 is configured to engage when moving the module between its assigned grow location on the floor of the facility 102 and a module docking location adjacent a transfer station 140. As described below, the loader 130 can autonomously navigate over the module, detect the module from overhead, and lift the module before moving the module laterally; in this implementation, the module can include optical fiducials 114 arranged across the top side of the tray, lid, or hydroponic tubes, etc. such that these optical fiducials 114 may be detected by the loader 130 and thus enable the loader 130 to align itself over the module before lifting the module from hard points on the frame. Alternatively, the loader 130 can be configured to autonomously navigate under the module. In this implementation, the module can include optical fiducials 114 arranged across the underside of the frame, tray, or hydroponic tubes, etc. such that these optical fiducials 114 may be detected by the loader 130 and thus enable the loader 130 to align itself under the module before engaging the module. Yet alternatively, the module can include: a set of wheels, casters, or rollers, etc.; a latch on a side or rear of the frame; and optical fiducials 114 adjacent the latch. The loader 130 can thus detect these optical fiducials 114 to align itself to the latch, engage the latch accordingly, and then pull or push the module between its assigned location on the facility 102 floor and a module docking location adjacent a transfer station 140.

However, a module can define any other structure or geometry and can define any other number or arrangement of plant slots.

3.2 Loader

As shown in FIGS. 1, 3, and 7, the loader 130 (e.g., a wheeled autonomous vehicle) is configured to navigate autonomously throughout the facility 102: to relocate modules to a module docking location adjacent a transfer station 140 in preparation for loading plants into or unloading plants from these modules in Block S110; and to selectively return these modules to their assigned grow locations throughout the facility 102. In particular, the loader 130 can be configured to automatically navigate throughout the facility 102 to a particular location under or near a module, to couple to or lift the module, to navigate—with the module—to a transfer station 140 within the facility 102, and to release (or "deposit") the module at the transfer station 140. The robotic manipulator 150 can be arranged near the center of the transfer station 140, and the loader 130 can arrange a first module 110 of a nursery-type (e.g., defining a first array of plant slots in of a first density) and a second module 120 of a finishing-type (e.g., defining a second array of plant slots 121 of a second density greater than the first density) adjacent the robotic manipulator 150 at the transfer station 140 in order to enable the robotic manipulator 150 to navigate its end effector 154 across both the full extent of plant slots in the first module no and the full extent of plant slots in the second module 120. The loader 130 can also deposit a third module 122 of the finishing-type to the transfer station 140, such as adjacent the second module 120, and the robotic manipulator 150 can transition to transferring cleared plants from the first module 110 to the third module 122 once all plant slots in the second module 120 are filled. The loader 130 can also deposit a fourth module 124 of the nursery-type (e.g., an "extended grow time" module of the nursery-type) to the transfer station 140, and the robotic manipulator 150 can transfer underweight plants removed from the first module no into the fourth module 114 to enable access to a next plant in the first module 110, which may be of a sufficient weight for transfer into the second module 120 of the finishing-type. The loader 130 can then return the second, third, and/or fourth modules to assigned grow areas within the facility 102, such as under a translucent roof and/or under artificial lighting.

The loader 130 can also deliver a seeding tray to the transfer module, and the robotic manipulator 150 can implement similar methods and techniques to check sizes and weights of plants in the seeding tray and to sequentially transfer plants from the seeding tray into the first module no before the loader 130 returns the first module no to an assigned grow area within the facility 102. Alternatively, the system 100 can include a second robotic manipulator 150 arranged at a second transfer station 140 within the facility 102, and the loader 130 can deliver the first module no and the seeding tray to the second transfer station 140, and the second robotic manipulator 150 can transfer sprouts from the seeding tray into the first module 110.

3.3 Transfer Station

Figure 5:
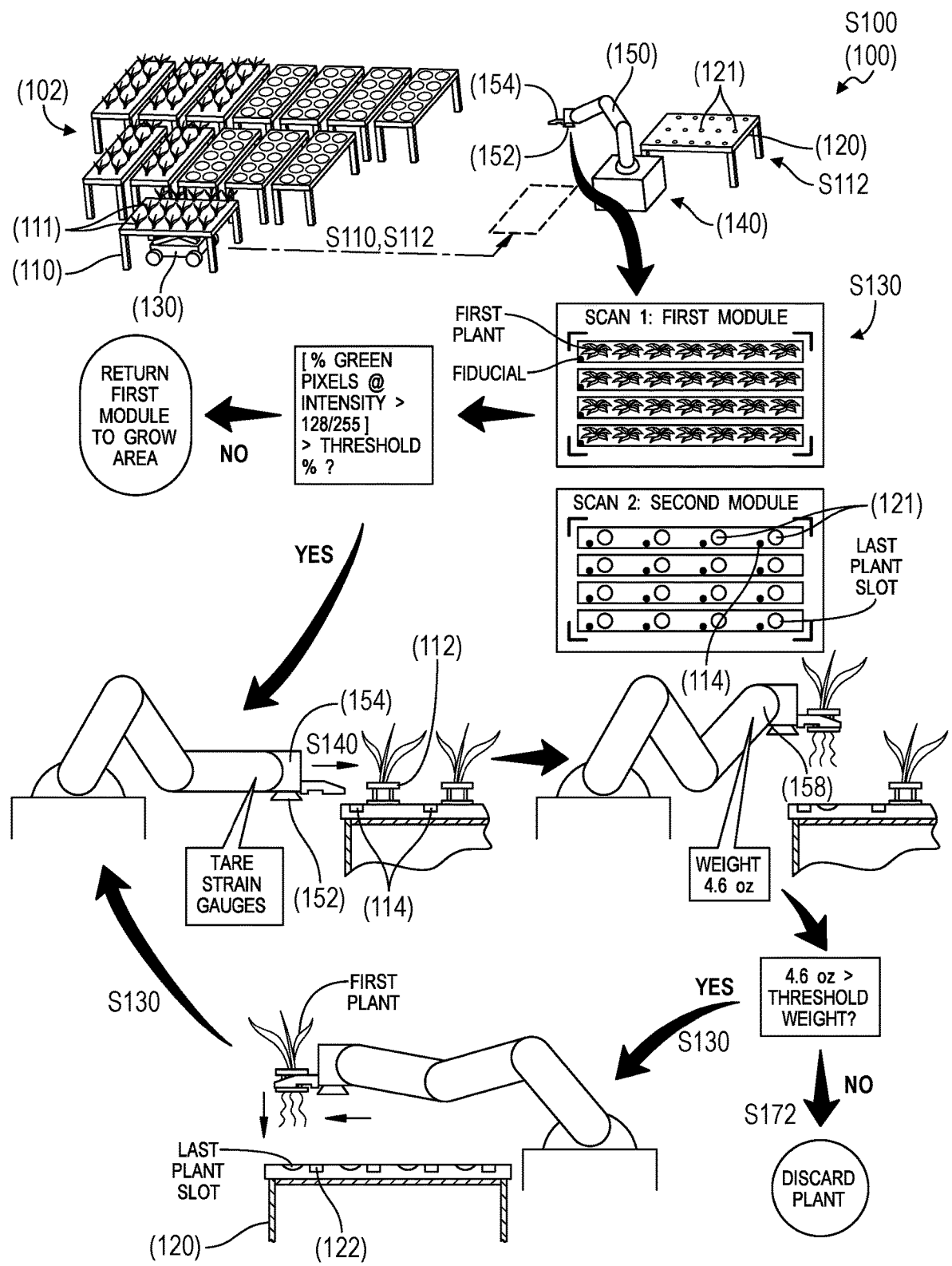
FIG. 5 is a flowchart representation of one variation of the method.

As shown in FIGS. 1, 5, and 8, the system 100 also includes a transfer station 140 arranged within the facility 102 and defining a location at which plants are autonomously inspected and transferred from a first module 110 (e.g., a nursery-type module) containing a higher density of plants slots to a second module 120 (e.g., a finishing module) containing a lower density of plants slots.

The system 100 can also include a robotic manipulator 150: arranged at the transfer station 140; defining a multi-link robotic manipulator 150 that is sufficiently mobile to reach each plant slot in a module temporarily positioned at the transfer station 140; including an end effector 154 configured to engage plant cups 112 supporting plants in this module; and/or including an optical sensor 152 (e.g., a multispectral camera, or a stereoscopic camera, etc.) configured to record module-level optical scans of modules delivered to the transfer station 140 and/or to record plant-specific optical scans of plants in these modules, as described below. The system 100 (e.g., the controller 104) can process these optical scans (or otherwise process optical data recorded by the optical sensor 152 or process the field of view of the optical sensor 152) to detect optical fiducials 114 on these modules, to detect plants in these modules, and to qualify or quantify viability of these plants.

In one implementation, the robotic manipulator 150 includes: a base rigidly mounted to a floor of the facility 102 at a transfer station 140; an end effector 154 configured to engage plant cups 112 and supporting one or more optical sensors 152; and multiple independently-operable links and joints that couple between the base to the end effector 154 and that cooperate to navigate the end effector 154 across full lengths and widths of plant slots in modules (e.g., a nursery-type module and a finishing-type module) temporarily positioned at the transfer station 140.

Alternatively, the transfer station 140 can include a (short) bi-directional conveyor 156 (or other linear slide or linear actuator) rigidly mounted to the floor of the facility 102 at the transfer station 140 and configured to move a sled along the length of a module docking location at the transfer station 140. The base of the robotic manipulator 150 can be mounted to the sled, and the conveyor 156 can thus move the robotic manipulator 150 along the length of the module docking location. For example: modules in the system 100 can be approximately four feet in width and eight feet in length; the loader 130 can temporarily position a first module no in a module docking location at the transfer station 140 with a long edge of the first module 110 adjacent and approximately parallel to the conveyor 156; and the robotic manipulator 150 can be configured to reach and reliably engage a plant cup 112 in a plant slot offset from the centerline of the conveyor 156 by up to six feet (i.e., more than the width of the module but less than the length of the first module no.) In this example, the conveyor 156 can thus move the robotic manipulator 150 linearly along (all or a portion of) the length of the module docking location in order to enable the robotic manipulator 150 to reach and reliably engage plant cups 112 along the full length of the far long side of the first module 110. In this implementation, the conveyor 156 can thus function to move the robotic manipulator 150 linearly along the length of the module docking location—and thus along a long edge of a module temporarily positioned in the module parking zone—in order to: enable a robotic manipulator 150 with a smaller working volume to execute Blocks of the method S100 at the transfer station 140; and/or to enable the system 100 to maintain high positional accuracy and control of the end effector 154, since positional accuracy and control of the end effector 154 may vary inversely with distance of the end effector 154 from the base of the robotic manipulator 150. In this variation, the robotic manipulator 150 and the conveyor 156 are described below generally as the "robotic manipulator 150."

In one variation, the robotic manipulator 150 further includes a weight sensor 158—such as in the form of a strain gauge integrated into a joint or into the end effector 154—configured to output a signal representing a weight or mass of a plant retrieved by the robotic manipulator 150.

3.4 Multiple Transfer Stations

The method S100 is described below as executed by the system 100 to test and transfer plants from a first module 110 of a nursery-type to a second module 120 of a finishing-type. However, the system 100 can implement similar methods and techniques to transfer plants between modules of any other type, configuration, or plant slot density. For example; a first robotic manipulator 150 at a first transfer station 140 can be configured to transfer plants from a seeding tray into modules of the nursery-type; a second robotic manipulator 150 at a second transfer station 140 can be configured to transfer plants from modules of the nursery-type to modules of the finishing-type; and a third robotic manipulator 150 at a third transfer station 140 within the facility 102 can be configured to transfer plants from modules of the finishing-type onto a conveyor 156, into boxes, or onto pallets for manual or automated processing and shipment from the facility 102. However, the method S100 can be executed to automatically test and transfer plants between modules of any other types—that is, between modules defining plant slot densities suitable for any other segments or durations of the grow cycle of a particular plant, plant sub-species, or plant species, etc. grown in the facility 102.

The method S100 is also described as executed by the system 100 to automatically transfer lettuce through a sequence of seeding trays, nursery-type modules, and finishing-type modules. However, the method S100 can be implemented in a greenhouse or other agricultural facility 102 in conjunction with growing any other type of plant, such as to grow fruit, vegetables, legumes, flowers, shrubs, or trees, etc.

3.5 Cleaning Station

In one variation, the system 100 further includes a cleaning station that define an enclosed automated cleaning booth and includes: an interior volume enclosed by an automated door; UV lighting configured to kill bacteria; cleaning jets configured to direct hot cleaning solution (e.g., steam or bleach diluted with water) and rinse water into the interior volume; and/or a blow dryer or forced-air jets. The cleaning station can also include a tilting floor configured to latch onto a module loaded into the cleaning station and to rotate the module about its left-right axis.

In one example, upon receipt of a module cleaning order, the loader can retrieve a corresponding target module, place this target module inside the cleaning station, and then leave the cleaning module to execute a next module transport order. The automated door of the cleaning station can then automatically close and latch while an electromechanical latch in the tilting floor automatically engages the module and then tilts the module approximately 90° about its left-right axis. The cleaning module can then: activate the UV lighting; and activate a heater and a pump to discharge steam or cleaning solution through cleaning jets directly downward and coaxially aligned with inlet ends of hydroponic trays in the target module in order to clean and force remaining plant matter out of these hydroponic trays. Later, the cleaning module can transition a set of rinse jets to spray cool rinse water onto and into the hydroponic trays and then activate the force air jets to blow air downward into the hydroponic trays to dry the target module. The tilting floor can then return to level, the electromechanical latch in the tilting floor can release the target module, and the automated door can unlatch and open. The computer system 104 can then serve a module transport order to retrieve the target module and to deliver the target module to a holding area or to a transfer station to be loaded with a next set of plants.

In another implementation, the cleaning station can define a drive-through cleaning booth. For example, the loader can place a target module onto a moving platform at the entrance of the cleaning station—according to a module cleaning order—and then retreat out of the cleaning station. Upon receipt of the target module, the cleaning station can move the target module forward through wetting-down, soaping, washing, rinsing, and drying stages and finally deposit the target module at the exit of the cleaning station. The loader can then collect the target module at the exit of the cleaning station and deliver the target module to a holding area within the facility or to a transfer station to be loaded with a next set of plants, as described above.

Yet alternatively, the loader can deliver a target module to a cleaning station for manual cleaning by human workers.

3.6 Quarantine Station

In one variation, the system 100 also includes a quarantine station arranged within or adjacent the facility. For example, the quarantine station can include: a sequestered area within the facility; an automatic double door that isolates the sequestered area from the grow area within the facility; and a holding zone inside the automatic double door. When delivering a module to the quarantine station, the loader can: autonomously navigate from the grow area within the facility to the double door; transmit a command to the automatic double door to open a first door between the grow area and the holding zone inside the double doors; autonomously navigate into the holding zone; deposit the module into the holding zone; autonomously navigate from the holding zone back to the grow area; and transmit a command to the automatic double door to close the first door in order to seal off the holding zone and this module from the grow area. A human operator or other autonomous machine can then: open the second door of the automatic double door between the holding zone and the sequestered area; move the module into the sequestered area; and close the second door. Plants in the module can then be removed, discarded, incinerated, or otherwise disposed of; and the module can be cleaned, such as in a second cleaning station inside the sequestered area before the module is returned to service in the grow area in the facility.

4. Module Collection and Transfer

Block S110 of the method S100 recites navigating to a first module located in a grow area within a facility, wherein the first module defines a first array of plant slots at a first density and loaded with a first set of plants in approximately a second growth stage; and Block S112 of the method S100 recites delivering the first module to a first transfer station within the facility. Block S120 of the method S100 recites navigating to a second module located within the facility, wherein the second module defines a second array of plant slots at a second density less than the first density and empty of plants; and Block S122 of the method S100 recites delivering the second module to the first transfer station.

Figure 6:
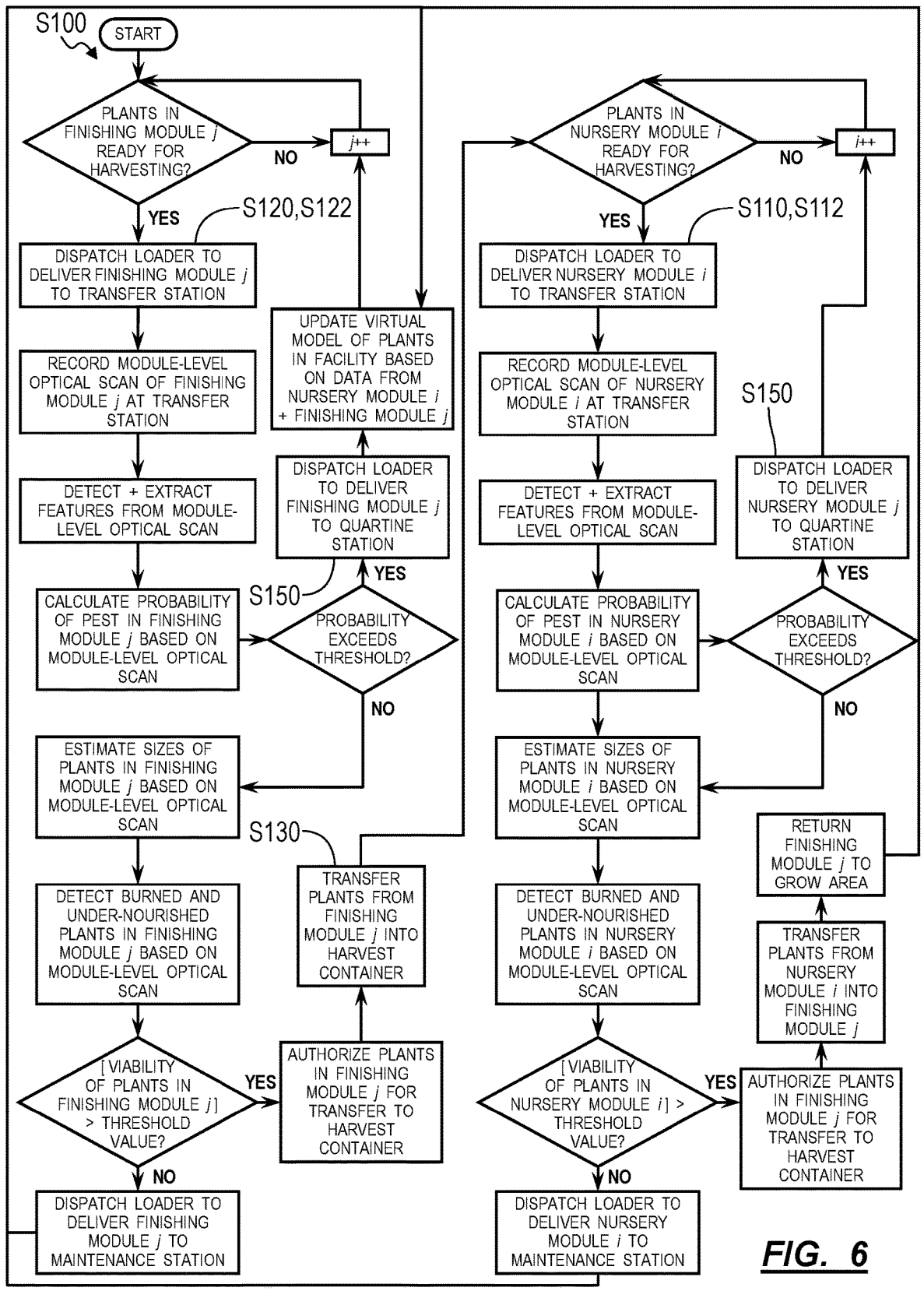
FIG. 6 is a flowchart representation of one variation of the method.

Generally, in Blocks S110 and S112, the loader retrieves a first module—of a first type and loaded with plants scheduled for transfer to a next type of module—from its assigned grow location within the facility and delivers the first module to a transfer station, as shown in FIGS. 1 and 6. Similarly, in Blocks S120 and S122, the loader retrieves a second, empty module of a second type—such as from another transfer station, a cleaning station, or from a holding area within the facility—and deposits the second module near the first module at the transfer station in preparation for transfer of plants from the first module into the second module. Alternatively, in Blocks S120 and S122, the loader can retrieve a second module—of the second type and loaded with a second set of plants scheduled for transfer (e.g., harvest)—from its assigned grow location within the facility and deposit the second module near the first module at the transfer station in preparation for transfer of the second group of plants out of the second module and in preparation for transfer of plants from the first module into the second module.

4.1 Module Transfer Schedule

In one implementation, the computer system maintains a schedule (or "calendar") of module transport orders, and the loader executes module transport orders upon receipt from the computer system. In this implementation, each module transport order can specify a particular module (e.g., by serial number or other substantially unique identifier), the current (e.g., last known) location of the particular module within the facility, and the destination location for the particular module (e.g., a particular transfer station, a particular stall within a grow location, the cleaning station, etc.); and the computer system can transmit these module transport orders to the loader (e.g., over the Internet and/or via a wireless connection) according to the schedule.

The computer system can populate the schedule with module transport orders based on various parameters. For example, the computer system can: access a plant calendar—for a plant type loaded into modules in the facility—defining time-based transfer, harvest, and cleaning triggers; access an historical schedule containing dates and times on which past module transport orders were completed by the loader, such as including previous dates and times on which a nursery module received a group of plants from a seeding tray, previous dates and times on which a finishing module received a group of plants from a nursery module, and previous dates and times on which modules were cleaned at the cleaning station; then generate a new set of module transport orders for each module based on triggers defined in the plant calendar and past module activities defined in the historical schedule. In particular, the computer system can generate module transfer orders based directly on ages of plants in each module.

In this implementation, the computer system can also: retrieve plant size and/or weight data collected at transfer stations when plants were previously loaded into modules in the facility; extrapolate a current or future size and/or weight of plants in a particular module based on time transpired and past plant size and/or weight data of plants in the module; access size- and/or weight-based transfer and harvest triggers; and then generate a module transfer order for the particular module that specifies a date and time on which at least a threshold proportion (e.g., 90%) of plants in the module are predicted to reach size and/or weight values defined by these size- and/or weight-based triggers.

Similarly, the computer system can update or modify time-based transfer and harvest triggers in a plant calendar for a particular module or for a particular group of modules of the same type containing the same type of plant based on plant size and/or weight data collected from these modules or from modules stationed in this area. Similarly, the computer system can tailor time-based transfer and harvest triggers for a particular area or cluster of stalls in the facility based on plant size and/or weight data collected from these modules or from modules stationed in this area, such as to account for different light levels, temperatures, etc. in different areas of the facility.

Once a new module transport order is generated, the computer system can insert this new module transport order into the schedule by its assigned date. The computer system can reorder module transport orders specifying similar dates and times in order to reduce total distance traversed by the loader within a duration of time (e.g., an eight-hour time block) based on current or assigned future locations of each module in the grow location, a virtual map (e.g., engineering plan) of the facility, and/or predefined navigable aisles within the facility.

The computer system can then feed a module transport order to the loader according to when its assigned date and time is reached. Upon receipt of a module transport order, the loader can execute this module transport order, as described below, before receiving a next module transport order from the computer system. Alternately, the computer system can transmit module transport orders to the loader in batch, and the module can selectively execute these module transport orders according to their assigned dates and times.

4.2 Path Planning

In one implementation, the computer system: retrieves a virtual map of the facility; accesses a current location of the loader and a current (e.g., a last delivery) location of a target module specified in a current module transport order; and then generates a navigational path—from the loader's current location to the location of the target module—that avoids obstacles throughout the facility, such as known locations of transfer stations and last known locations of other modules. In this implementation, the navigation path can include a set of waypoints—such as GPS-based waypoints, waypoints based on features within the facility, waypoints containing coordinates of an indoor mapping system assigned to the facility, etc.—from the loader's current location to the target module and onto the delivery location (e.g., a transfer station). Furthermore, the computer system can retrieve a last location and orientation of the loader when previously placing the target module in its current location, store this location and orientation in a target module waypoint, and incorporate this target waypoint in the navigation path such that, when the loader navigates to and aligns with the target module waypoint, the loader is approximately aligned laterally and longitudinally with the target module and thus ready to engage the target module. Similarly, the computer system can insert a predefined transfer station waypoint into the navigation path such that, when the loader navigates to and aligns with the transfer station waypoint, the loader has properly positioned a module adjacent the transfer station. For example, the computer system can: insert an unloading transfer station waypoint into a navigation path for transporting a full module to a transfer station for unloading; and insert a loading transfer station waypoint into a navigation path for transporting an empty module to a transfer station for loading.

The computer system can then upload this navigation path to the loader, and the loader can sequentially navigate to each waypoint in the navigation path while implementing obstacle avoidance techniques to avoid impact with modules and other objects within the facility in Block S110. Alternatively, the loader can implement the foregoing methods and techniques locally.

4.3 Alignment to the Target Module

Once the loader reaches a target module, the loader can register its position to the target module to ensure proper alignment before engaging the target module, as shown in FIG. 7. In one implementation, the loader autonomously navigates through the set of waypoints defined in the navigation path up to the target module waypoint. Upon realization of the target module waypoint (e.g., under and centered with the target module), the loader can: record a digital photographic image or video stream through an upward-facing (or side-facing) optical sensor (e.g., camera) integrated into the loader; locally implement computer vision techniques to detect one or more active or passive optical fiducials arranged on the underside of the target module, such as quick-response codes applied to or infrared emitters integrated into the undersides of hydroponic trays or corners of the frame of the target module; and then register its position to these fiducials. The loader can then rotate, move laterally, and/or move longitudinally to orient these optical fiducials in target locations in the field of view of the camera. For example, the loader can include four independently-controlled omnidirectional wheels and can selectively actuate the wheels to move laterally, move longitudinally, and/or to rotate itself into alignment with the target module.

However, the loader can implement any other methods or techniques to align itself with the target module.

4.4 Module Collection

Once the loader is aligned to the target module, the loader can collect the target module in preparation for transport to the final destination specified in the current module transport order. For example, once assigned a transport order to deliver a first module to the transfer station, the loader can autonomously navigate toward a first grow location—within the grow area in the facility—assigned to the first module. In this example, the first grow location can be associated with a first waypoint that defines a lateral position, a longitudinal position, and an orientation of the first grow location referenced to a local or global coordinate system. As the loader approaches the first waypoint, the loader can: record an optical image of the first grow location; detect an (passive or active) optical fiducial on the first module in this optical image; physically align itself to the first module based on the position and orientation of the optical fiducial in the field of view of the loader; and then elevate the first module off of the first grow location before departing to a destination assigned to the first module.

In one implementation, the loader includes an electromechanical, electrohydraulic, or electropneumatic scissor lift, jack, or other lifting element configured to raise the target module off of the floor of the facility; once aligned to the target module, the loader can trigger the lifting element to rise, as shown in FIG. 1. The lifting element can also include an electromechanical latch; once the lifting element is in contact within the target module, the loader can trigger the latch to engage a bolt or other feature extending from the target module in order to lock the loader to the target module. The loader can then navigate to a transfer station waypoint before reversing these steps to disengage and release the target module at the transfer station. Alternatively, modules in the facility can include wheels or castors; and the loader can engage the target module and push or pull the target module from the target module waypoint to the transfer station waypoint. Yet alternatively, the loader can engage and lift the module from above.

Furthermore, in the variations described above in which modules in the facility include fluid and/or electrical plugs configured to transiently engage fluid supply, fluid return, and/or electrical sockets at stalls throughout the facility, the loader can execute a module disengage routine to disconnect the target module from its current stall. For example, in the variation described above in which modules in the facility interface with a main fluid supply and main fluid return, the loader or the remote computer system can transmit a command in the main fluid supply to disable fluid flow to the target module and can transmit a command to valves in the target module to cease fluid flow out of the target module (e.g., in this order with a time delay of one minute) in preparation for transport of the target module. Once engaged within the target module, the loader can back up or raise the target module to sever the inlet and outlet couplers of the module from the main supply and return sockets. In another example, in which modules in the facility include their own integrated fluid circulation systems, as described above, the loader or the computer system can transmit a command to the target module to cease circulation (e.g., disable an integrated pump) prior to transport or at least a threshold time (e.g., five minutes) prior to transfer of plants out of the target module and into a next module in order to allow roots of plants in the target module to partially dry before being removed from the target module and then weighed by a robotic manipulator at the transfer station.

However, the loader can implement any other technique to engage the target module and to prepare the target module for transport.

4.5 Module Placement

Once the loader engages a target module, the loader can implement methods and techniques described above to navigate to a final destination specified in the module transport request (e.g., a transfer station), as shown in FIGS. 1 and 2. For example, upon retrieving a first module in Block S110, the loader can implement obstacle avoidance techniques to avoid impact with other objects while navigating to a first module docking location adjacent the transfer station (e.g., to the transfer station waypoint defined in the facility). In this example, the loader can autonomously navigate toward a second waypoint that defines a lateral position, a longitudinal position, and an orientation—of the first module docking location at the transfer station—referenced to the local or global coordinate system described above. As the loader approaches this second waypoint, the loader can: record an optical image of the first module docking location adjacent the transfer station; detect an (passive or active) optical fiducial at or near the first module docking station in this optical image; physically align itself to the first module docking station based on this optical fiducial; and then lower the first module onto the first module docking station (or trigger a latch to release the loader or otherwise disengage the first module to complete the module transport order) before departing to execute a next module transport order.

The loader can implement similar methods and techniques to deposit a module: at a second module docking location at the first transfer station; at module docking locations at other transfer stations within the facility; at a cleaning station; in a quarantine station; and/or back to a grow location assigned to the module; etc.

4.6 Plant Transfer Preparation

The loader can implement the foregoing methods and techniques: to retrieve the first, full module from a grow location in Block S110; to deliver the first module to the transfer station in Block S112; to retrieve a second, empty module (e.g., from another transfer station at which the second module was recently emptied, from a cleaning station, from a holding area, or from a repair station, etc. within the facility) in Block S120; and to deliver the second module to the transfer station in Block S122 in preparation for transfer of a subset of plants from the first module to the second module. The robotic manipulator (e.g., a robotic arm) at the transfer station can then scan plants in the first module, confirm that these plants fulfill predefined viability requirements, and then sequentially transfer a subset of plants from the first module into the second module, as described below. Throughout this process, the loader can implement similar methods and techniques to deliver additional (full or empty) modules to the transfer station, and the robotic manipulator can sequentially transfer corresponding subsets of plants in the first module into these other modules, as described below, until the first module is emptied.

4.7 Module Return

Block S124 of the method S100 recites, following transfer of a first subset of plants—in the first set of plants—from the first array of plant slots in the first module into the second array of plant slots in the second module at the first transfer station, delivering the second module to the grow area in the facility. Generally, once a module is filled at a transfer station, the loader can collect the module from the transfer station and return it to an assigned location specified in a module transport order in Block S124. For example, in Block S124, the loader can implement methods and techniques described above to engage a full module at the transfer station, navigate through the facility to a stall assigned to the module, and then disengage the module upon arrival at this stall according to the module transport order, as shown in FIG. 1.

Upon delivery of the first and second modules to the transfer station, a robotic manipulator or other autonomous system (or a human operator) can transfer plants from plant slots in the first module to plant slots in the second module. As the robotic manipulator prepares to fill final plants slots in the second module, the computer system can generate (or surface, or "bubble to the top") a module transport order specifying delivery of a third empty module—of the same type as the second module—to the transfer station and transmit this module transport order. The loader can then implement methods and techniques described above to retrieve the third module according to this module transport order and can exchange the third module for the second module at the transfer station. Once the second module has been replaced with the third module, the robotic manipulator can transition to transferring plants from the first module to the third module.

The computer system can also pair the module transport order requesting delivery of the third module to the transfer station with a module transport order requesting transport of the second module from the transfer station to an assigned stall in a grow location in the facility and serve these module transport orders to the loader as the second module nears capacity. The computer system can also lock an order for these module transport orders such that, when executed in order by the loader, the loader first delivers the third module to the transfer station and then removes the second module from the transfer station. Furthermore, the computer system can intertwine these module transport orders such that, when executed by the loader, the loader: retrieves the third module; places the third module in a holding area adjacent the transfer station; retrieves the second module from the transfer station; places the second module adjacent the third module; reengages the third module; places the third module at the transfer station; reengages the second module; and then places the second module at its assigned location in the facility. The computer system can therefore implement methods and techniques described above to generate one or multiple module transport orders responsive to a state change of a module in the facility and can serve these module transport orders to the loader substantially in real-time.

4.8 Module Reloading

Block S114 of the method S100 recites, following removal of the first set of plants from the first array of plant slots in the first module and insertion of a second set of plants—in approximately a first growth stage preceding the second growth stage—into the first array of plant slots in the first module, returning the first module to the grow area within the facility. Generally, once a module is emptied of a first set of plants at one growth stage and then reloaded with a second set of plants at an earlier growth stage (e.g., at a single transfer station or at two separate transfer stations in the facility), the loader can deliver the module to its assigned grow location within the facility in Block S114.

4.8.1 Example: Multiple Transfer Stations

In one implementation shown in FIGS. 1 and 4, the loader delivers to the first transfer station (e.g., a nursery-to-finishing transfer station): one full module of a first type directly from its assigned grow location; and one or more empty modules of a second type, such as from a cleaning station or module holding zone in the facility. For example, the loader can deliver to the nursery-to-finishing transfer station: a first full, nursery-type module containing 48 "mid-heading" plants from its assigned grow location in the facility directly to the first transfer station; and second, third, fourth, and fifth finishing-type modules—each defining twelve plant slots—from a cleaning station, module holding zone, or a finishing-to-harvest transfer station within the facility. The robotic manipulator can then sequentially transfer plants from the first module to the second, third, fourth, and fifth modules, as described below. (In this example, the loader can also deliver to the first transfer station a sixth empty, nursery-type module; and the robotic manipulator can selectively insert undersized plants from the first module into the sixth module before the loader returns this sixth module to the grow area in the facility to permit these plants to further mature before being loaded into a finishing-type module in the future.)

Furthermore, in this example, as the robotic manipulator prepares to empty a final subset of plants from the first module, the computer system can: generate (or escalate) a module transport order requesting transfer of the first module from the nursery-to-finishing transfer station to the seeding-to-nursery transfer station; and then serve this module transport order to the loader. The loader can then implement methods and techniques described above to deliver the first module to the seeding-to-nursery transfer station according to this module transport order. If a seeding tray containing sprouts is not currently located at the seeding-to-nursery transfer station, the computer system can similarly dispatch the loader to deliver a seeding tray (e.g., loaded with plants in the "early-heading" stage) to the seeding-to-nursery transfer station. Once the first module and the seeding tray are thus located at the seeding-to-nursery transfer station, a second robotic manipulator at the seeding-to-nursery transfer station can execute a transfer cycle to transfer sprouts from the seeding tray into plant slots in the first module.

Therefore, in Block S114, the loader can: navigate to the first module at the first transfer station in response to removal of a first set of plants from the first array of plants slots in the first module; deliver the first module to a second transfer station within the facility; and then return the first module to the grow area within the facility following insertion of the second set of plants—from another earlier-stage module—into the first array of plant slots in the first module at the second transfer station.

4.8.2 Example: Full Module Transfer

Alternatively, the loader can deliver a second, finishing-type module—loaded with a second group of plants estimated to be ready for harvest (e.g., according to a timer or plant model associated with the module)—to a second module docking location at the first transfer station, as shown in FIG. 6. The system 100 can then implement methods and techniques described below to scan plants in the second module, confirm that these plants fulfill predefined viability requirements (e.g., related to size, shape, color, and pest presence, etc.) for harvest-ready or mature-heading plants, and then sequentially transfer plants from the second module into a harvest container or onto a harvest conveyor belt adjacent the first transfer station. During these transfer cycles or once the second module is fully emptied by the robotic manipulator, the loader can retrieve the first, nursery-type module—loaded with a first group of plants estimated to be ready for transfer into a finishing-type module (e.g., according to a timer or plant model associated with the module)—from its grow location in the facility and deliver the first module to the first transfer station, as described above. The system 100 can then implement methods and techniques described below to: scan plants in the first module; confirm that these plants fulfill predefined viability requirements (e.g., related to size, shape, color, and pest presence, etc.) for "mid-heading" plants ready for a finishing-type module; and then sequentially transfer plants from the first module into the second module still located at the first transfer station.

As the robotic manipulator fills the second module with plants from the first module, the loader can: navigate to a third, finishing-type module—loaded with another group of plants estimated to be ready for harvest—in the grow area of the facility; engage the third module; and navigate back to the first transfer station with the third module in tow. Once the second module is filled with a first subset of plants from the first module, the loader can: move the second module out of the second module docking location at the first transfer station; locate and release the third module over the second module docking location; and return the second module to its assigned grow location within the facility.

The system 100 (e.g., the robotic manipulator) can then implement methods and techniques described below to scan plants in the third module, confirm that these plants fulfill predefined viability requirements (e.g., related to size, shape, color, and pest presence, etc.) for harvest-ready or mature-heading plants, and then sequentially transfer plants from the third module into the harvest container or onto the harvest conveyor belt. Once the third module is empty, the system 100 (e.g., the robotic manipulator) can sequentially transfer plants from the first module into the third module.

The system 100 can repeat these processes to deliver additional finishing-type modules, to harvest plants from these additional finishing-type modules, and to transfer subsets of plants from the first, nursery-type module into these additional finishing-type modules until the first module is empty. The system 100 can further repeat these processes for a next nursery-type module loaded with a set of plants scheduled for transfer.

5. Plant Transfer

In Block S112, the loader can thus deliver a first module—of a first (e.g., nursery) type filled with plants currently nearing the end of a nursery stage, entering a finishing stage, or transitioning from a "mid-heading" state to a "mature-heading" stage—to the transfer station. In Block S122, the loader can similarly deliver the second module—of a second (e.g., finishing) type—to the transfer station. Upon receipt of the first and second modules at the transfer station, the robotic manipulator can: scan plants in the first module to confirm that these plants generally and/or individually fulfill predefined viability requirements related to size, shape, color, and pest presence; and then sequentially transfer a first subset of plants from the first module into the second module if these plants pass the predefined viability requirements in Block S130. As the robotic manipulator fills plant slots in the second module with plants from the first module, the loader can: retrieve a third module, also of the second (e.g., finishing) type; exchange the second module for the third module at the transfer station; and return the second module to the grow area. The robotic manipulator can then transfer a second subset of plants from the first module into the third module. The robotic manipulator and the loader can repeat this process to transfer remaining plants from the first module into other modules of the second type until the first module is empty. Once the first module is empty, the loader and the robotic manipulator can repeat these processes for a next module of the first type and filled with another set of plants similarly nearing the end of the nursery stage, entering the finishing stage, or transitioning from a "mid-heading" state to a "mature-heading" stage.

5.1 Module-Level Optical Scan by Robotic Manipulator

In one variation shown in FIGS. 5, 6, and 8, the system 100 collects initial optical data of plants arranged in the first module once the first module is delivered to the transfer and then extracts various plant-related metrics from these optical data. For example, upon arrival of the first module to the transfer station, the robotic manipulator can record a module-level 2D or 3D scan of all plants currently housed in the first module, and the system 100 can then implement computer vision techniques to extract relatively low-resolution plant size, plant quality, and/or indicators of pest presence, etc. for each of these plants from this module-level scan, as shown in FIGS. 5 and 6.

In one variation, the system 100 records the module-level optical scan—of the width and length of the first module—via an optical sensor arranged at the transfer station in response to arrival of the first module at the transfer station. In one implementation, the robotic manipulator includes a stereoscopic color camera integrated into or arranged near the end effector, as shown in FIG. 5. Upon arrival of the first module at the transfer station, the robotic manipulator navigates the end effector to a predefined position that orients the camera over the first module and then triggers the camera to record a single 3D top-down photographic image (or "optical scan") of the first module. In particular, the system 100 can navigate the end effector on the robotic manipulator to a predefined scan position over the first module docking location—and therefore over the first module—in response to arrival of the first module at the transfer station and then record a module-level optical scan of the first module through the optical sensor integrated into the end effector or otherwise coupled to the robotic manipulator. The system 100 can then detect—in the module-level optical scan or otherwise in the field of view of the camera when the robotic manipulator occupies this scan position—an optical fiducial arranged on the first module, register motion of the end effector to this optical fiducial, and then position the end effector and camera at a target location over the first module relative to this optical fiducial before recording the optical scan of the first module via the camera.

Alternatively, the robotic manipulator can include a 2D color camera (or multispectral camera, etc.). Upon arrival of the first module at the transfer station, the robotic manipulator can: navigate the end effector and the camera through multiple preset positions, such as in machine coordinates or relative to an optical fiducial detected on the first module; and record a two-dimensional photographic image of the first module through the camera at each of these positions. The robotic manipulator (or the system 100 more generally) can then stitch these two-dimensional photographic images into a single 3-D photographic image (or "optical scan") representing plants currently housed in the first module.

Yet alternatively, the robotic manipulator can include a depth camera that includes an active infrared texture projector, and the robotic manipulator can record a depth image of the width and length of the first module; and the robotic manipulator (or the system 100 more generally) can reconstruct 3-D shapes of plants in the first module from this depth image. However, the robotic manipulator can implement any other method or technique to capture a 2-D to 3-D optical scan of the first module.

Once this optical scan of the first module is thus recorded and before initiating a transfer cycle to move plants from the first module to a second module nearby, the system 100 can extract metrics of plants in the first module and confirm that these plants meet predefined checks—such as size, leaf color, or lack of pest indicators—based on these metrics.

5.2 Plant Size

In one implementation, the system 100 checks that plants currently housed in the first module are generally of a size sufficient to warrant transfer from the first module to a second, finishing-type module. In particular, if plants in the first module generally exceed a preset threshold size, these plants may grow faster and be of higher quality if transferred to the second module. However, if metrics extracted from the module-level scan image of the first module indicate that plants in the first module do not generally exceed the preset threshold size: transfer of these plants to the second module may yield minimal—or may even negative—impact on grow rate and quality of these plants while simultaneously reducing efficiency of plant distribution throughout the facility; and use of the robotic manipulator to transfer plants out of the first module may delay transfer of higher-need plants out of another module. Therefore, the system 100 can analyze the module-level optical scan of the first module to determine whether the plants are generally of sufficient size before either: triggering the loader to return the first module to its previous grow location within the facility; or triggering the robotic manipulator to initiate a transfer cycle in which the robotic manipulator sequentially selects plants from the first module and scans these individual plants (e.g., at greater resolution) before discarding or placing these individual plants in the second module.

In this implementation, the system 100 can execute computer vision techniques, such as edge detection or blob detection, to: identify a perimeter of the first module in the optical scan; count a number of green pixels in the optical scan (e.g., a number of pixels exceeding a threshold intensity or brightness in the green color channel in the optical scan); and then authorize plants in the first module for transfer to a second module if the ratio of green pixels to a total number of pixels in the image exceeds a threshold ratio. Similarly, the system 100 can implement a color classifier to classify a likelihood that pixels in the optical scan represent a plant and then count the number of pixels in the optical scan that are classified as 'likely to represent a plant.'

The system 100 can implement these methods and techniques for each color channel in the optical scan, merge classifications for corresponding pixels in each color channel, count a number of pixels in a composite color space that are 'likely to represent a plant,' and then authorize the robotic manipulator to execute a sequence of transfer cycles to move plants outs of the first module and into a second, finishing-type module if the count of pixels classified as 'likely to represent a plant' exceeds a threshold pixel count or exceeds a threshold proportion of all pixels in the optical scan that correspond to the first module. The system 100 can therefore "pass" or "fail" plants housed in the first module based on fill factor—that is, a proportion of foliage or leaf cover area over the first module detected in a two-dimensional optical scan of the first module, as shown in FIGS. 5 and 6.

Similarly, the system 100 can detect optical fiducials on the first module in the optical scan and align a preexisting plant slot map for the module type of the first module to these optical fiducials to locate approximate centers of each plant slot—and therefore each plant—in the first module. For a first plant slot in the first module thus located in the optical scan, the system 100 can then: detect a cluster (or "blob") of green pixels—exceeding a threshold intensity or brightness in the green color channel in the optical scan—radiating from the approximate center of the first plant slot in the optical scan; associate this cluster of green pixels with a first plant in the first plant slot in the first module; estimate a size (e.g., an approximate diameter) of the first plant based on a size and geometry of this cluster of green pixels; and repeat this process for each other plant slot located in the first module. The system 100 can then authorize the robotic manipulator to transfer plants in the first module to the second, finishing-type module: if the mean or average size of plants in the first module exceeds a threshold size; or if at least a threshold proportion of plants in the first module exceeds a preset minimum plant size; etc.

In the implementation described above in which the system 100 records a 3D optical scan of the first module, the system 100 can: implement similar methods and techniques to detect optical fiducials on the first module in the optical scan; align a preexisting plant slot map for the module type of the first module to these optical fiducials to locate approximate centers of each plant slot—and therefore each plant—in the first module; calculate a plane (approximately) intersecting each plant cup and/or plant slot in the first module; and then extract a peak height of a surface over the center of each plant slot located in the 3D optical scan and normal to the plane. The system 100 can: store peak height values for each plant slot as approximate heights of corresponding plants in the first module; and then authorize these plants in the first module for transfer to a second module if the mean or average height of these plants exceeds a threshold height or if at least a threshold proportion of plants in the first module exceed a minimum plant height, etc.

Therefore, the system 100 can: detect a first optical fiducial on the first module in the module-level optical scan; estimate locations of the first array of plant slots in the first module based on the first optical fiducial and a known plant slot layout for a first module type of the first module, as described above; detect areas of foliage of the first set of plants in the first module represented in the optical scan; estimate sizes of plants in the first set of plants based on discrete areas of foliage detected over locations of the first array of plant slots in the optical scan; and then authorize the first set of plants for transfer out of the first module and into finishing-type modules if more than a threshold proportion of plants in the first set of plants exhibit estimated sizes exceeding a target plant size. Furthermore, the system 100 can: reject transfer of the first set of plants from the first module if less than the threshold proportion of plants in the first set of plants exhibit estimated sizes exceeding the target plant size; and then dispatch the loader to autonomously return the first module back to the first grow location within the agricultural facility.

However, the system 100 can implement any other method or technique to characterize sizes of plants in the first module based on features detected in the module-level optical scan and to selectively pass or fail these plants accordingly.

5.3 Pests

Additionally or alternatively, the system 100 can implement computer vision techniques to detect pests or to detect indicators of pest pressure within the first set of plants in the first module from the optical scan recorded. In particular, before authorizing direct contact between the robotic manipulator and plants in the first module, the system 100 can: trigger the robotic manipulator to record a 2D or 3D optical scan of the first module; then analyze this optical scan for pests or indicators of pest pressure across plants housed in the first module; and authorize the robotic manipulator to initiate a sequence of transfer cycles only in the absence of detected pests or insufficient indicators of pest pressure across plants in the first module, thereby reducing opportunity for contamination of the robotic manipulator with pests through direct contact. For example, if the system 100 does detect pests or indicators of pests in the plants in the first module, the system 100 can: flag the first module; trigger the arm to move away from the first module or otherwise bar the robotic manipulator from contacting plants in the first module; and trigger the loader to move the first module to a separate quarantine area within the facility. Therefore, the system 100 can analyze the optical scan for pests or indicators of pests in plants in the first module and selectively trigger the robotic manipulator to execute a sequence of transfer cycles based on results of this analysis.

For example, the system 100 can scan the optical scan for dark (e.g., black or brown) round or lozenge-shaped spots that may indicate the presence of insects (e.g., ants, aphids, flies, silverfish, moths, or caterpillars, etc.) on plants within the first module. In this example, the system 100 can maintain a counter of such spots, authorize the first set of plants in the first module for transfer to a second module if the final value of this counter remains below a threshold value (e.g., "5"), and fail the first set of plants in the first module (e.g., flag the first module for quarantine and bar the robotic manipulator from interacting with these plants) if the final value of this counter exceeds the threshold value.

In another example, the system 100 can: record multiple optical scans of the first module over a period of time (e.g., five seconds); repeat the foregoing methods and techniques to identify dark spots in each of these optical scans; implement object tracking techniques to detect motion of these dark spots across the optical scans; confirm that these spots represent insects if the system 100 determines that these spots have moved throughout this sequence of optical scans; and then fail the first module accordingly. The system 100 can implement similar methods and techniques to detect parasites (e.g., chiggers, ticks, or mites) and/or gastropods (e.g., slugs) on leafy regions of plants shown in the optical scan.

In another example, the system 100 scans the optical scan for dark, discolored leaf regions that may indicate a nematode infestation. In this example, if the system 100 detects any such dark, discolored leaf region in the first module, the system 100 calculates a proportion of the leaf area in the first module are discolored, or detects any other sufficiently-strong indicator of pests in the first module, the system 100 can fail the first module and flag the first module and its contents for quarantine accordingly. The system 100 can similarly process the optical scan to detect mold or other fungus on plants in the first module.

Therefore, the system 100 can extract a set of features from the module-level optical scan and calculate a probability of pest presence in the first module based on the set of features, such as based on one or more features detected in the optical scan as described above. The system 100 can then reject transfer of the first set of plants from the first module and dispatch the loader to autonomously deliver the first module to a quarantine station within the agricultural facility if the probability of pest presence exceeds a threshold probability. However, if the probability of pest presence is less than the threshold probability, the system 100 can authorize the first set of plants for transfer out of the first module and trigger the robotic manipulator to sequentially transfer plants from the first module into the second module accordingly.

However, the system 100 can implement any other methods or techniques to detect pests—of any other type—directly or to infer the presence of pests in plants in the first module from color data contained in one or a sequence of optical scans of the first module.

5.4 Leaf Color

The system 100 can also extract color values from regions of the optical scan that correspond to leaves or other plant matter and can authorize the first set of plants in the first module for transfer to a second module if these color values fall within a target range (and vice versa). In particular, leaf color may exhibit strong correlation to plant "health," which may exhibit strong correlation to plant viability, salability, flavor, and/or value once harvested. After recording an optical scan of the first module, the system 100 can thus: extract color values of plants in the first module from the optical scan; qualify or quantify health of plants in the first module according to their corresponding color values; and authorize the robotic manipulator to initiate a sequence of transfer cycles to transfer these plants from the first module to a second, finishing-type module if the average health of these plants exceeds a preset minimum health value or if at least a minimum proportion of these plants exceeds a preset minimum health value.

Therefore, if visual characteristics of plants in the first module generally indicate that plants in the first module are unhealthy or otherwise exhibit low viability, the system 100 can queue the loader to remove the first module to a discard station in which the contents of the first module are discarded (e.g., to a remote compost bin), rather than waste robotic manipulator resources distributing plants that may be unlikely to recover to yield high-quality produce when harvested at a later time. (The system 100 can alternatively trigger the robotic manipulator to remove plants from first module and immediately discard these plants (e.g., to a local compost bin at the transfer station)).

In one implementation, the system 100 implements template matching or object recognition techniques to identify leaves in the optical scan, such as based on template images or models of leaves of plants of the same type and at similar growth stages as the first set of plants in the first module. The system 100 can then correlate light-colored (e.g., yellow, tan, brown) regions around perimeters of these leaves with chemical burns or insufficient nutrient supply and then flag these plants accordingly. The system 100 can then reject the first module entirely if: more than a threshold number of plants in the first module exhibit such chemical burns or indicators of insufficient nutrient supply; or if more than a threshold leaf area of plants in the first module exhibit such chemical burns or indicators of insufficient nutrient supply.

For example, upon rejecting the first module, the system 100 can: trigger the loader to deliver the first module to a discard station for removal and disposal of these plants; and then trigger the loader to deliver the first module to a repair station at which the first module may be inspected for defects and repaired or replaced with a like module if necessary. Alternatively, upon rejecting the first module, the system 100 can: calculate an adjusted nutrient blend for plants in the first module in order to preempt such chemical burns or improper nutrient supply in the future; and then assign this adjusted nutrient blend to the first module (and to other like modules containing plants of the same type in similar growth stages throughout the facility).

Yet alternatively, in the foregoing example, the system 100 can: determine that the module is malfunctioning based on chemical burns or improper nutrient supply thus detected in plants in the first module; dispatch the loader to deliver a third module of the same type as the first module (e.g., a nursery-type module) to the transfer station; trigger the robotic manipulator to transfer all plants (or all salvageable plants) from the first module to the third module; trigger the loader to deliver the first module to the repair station; and trigger the loader to deliver the second module to a recovery area within the facility at which these plants may recover from these chemical burns or nutrient deficiency, such as under lower-light-intensity and lower-temperature conditions.

In a similar example, if the system 100 identifies heat burns on plants in the first module from the optical scan, the system 100 can: trigger the loader to deliver the first module to a discard station for removal and disposal of these plants; and set a lower augmented or secondary light intensity across the facility or at a select region in the facility in which the first module was previously stationed in order to preempt similar heat burns to plants in other modules in the facility. Alternatively, the system 100 can trigger the loader to return the first module to an area of the facility assigned a lower-light-intensity (e.g., a lower intensity of augmented or secondary light). Yet alternatively, the system 100 can implement methods and techniques described below to trigger the robotic manipulator to transfer plants in the first nursery-type module to a second finishing-type module and assign the second module to a lower-light-intensity grow location within the facility in order to enable these burned plants to recover and grow.

Therefore, if the system 100 detects heat burns, chemical burns, or other nutrient deficiencies in plants in the first module from features extracted from the optical scan, the system 100 can dispatch the loader to deliver the first module to: a location in the facility in which these plants may be discarded; a location in the facility in which the first module may be inspected and repaired as needed; or to a grow location in the facility in which these plants may recover; etc. without triggering the robotic manipulator to interact with plants in the first module in order to allocate operation of the robotic manipulator to transferring higher-viability plants between other modules. Alternatively, if the system 100 detects heat burns, chemical burns, or other nutrient deficiencies in plants in the first module, the system 100 can execute methods and techniques described below to trigger the robotic manipulator to transfer these plants to another module that may better enable these plants to recover.

5.5 Failing the First Module

The system 100 can then flag the entire first set of plants in the first module as not ready for the next growth stage or otherwise not viable if the system 100 determines from the optical scan that all or at least a threshold proportion of plants in the first module fail one or more predefined viability metrics. For example, if the system 100 determines that plants in the first module are undersized but otherwise healthy (e.g., not exhibiting signs of chemical burns, malnourishment, or pests), the system 100 can: flag the first module for an extended growing period (e.g., an additional 48 hours in its assigned grow location in the facility); and call the loader to return the first module to an assigned grow location within the facility, as shown in FIGS. 5 and 6. However, if the system 100 determines that plants in the first module exhibit chemical burns or malnourishment too excessive for rehabilitation, the system 100 can: flag the first set of plants in the first module for disposal; and dispatch the loader to deliver the first module to a cleaning station within the facility. Similarly, if the system 100 determines that plants in the first module exhibit signs of pests, the system 100 can: flag the first set of plants in the first module for immediate quarantine and eventual disposal; flag the first module for sanitation; and dispatch the loader to immediately move the first module to the quarantine station, as described below.

5.6 Authorizing the First Module

However, if the system 100 determines that all or a sufficient proportion of plants in the first module pass all predefined viability metrics—such as exceed a threshold size (e.g., height, effective radius) or fill factor, exhibit foliage colors that fall within a predefined color set or color range, and/or exhibit less than a threshold probability of pest presence, as described above—the system 100 can: authorize the first set of plants in the first module (e.g., a nursery-type module characterized by a first density of plant slots) for transfer to a second module (e.g., a second finishing-type module characterized by a second density of plant slots less than the first density of plant slots); and then trigger the robotic manipulator to execute a sequence of transfer cycles to move these plants out of the first module and into next modules, as shown in FIG. 6. In particular, if the system 100 determines from features extracted from the optical scan that all or at least a threshold proportion of plants in the first module are of a size greater than a threshold size, exhibit shapes within a target geometry range, exhibit foliage (or fruit) colors within a target color range, and/or exhibit no or limited signs of pests or pest pressure, etc. the system 100 can trigger the robotic manipulator to execute a sequence of transfer cycles to move a first subset of plants from the first module to a second module, a second subset of plants from the first module to a third module, etc.

For example, the system 100 can characterize viability of a group of plants in a module by extracting a set of features from an optical scan of the module—recorded at a transfer station (or by the loader, as described below); estimate sizes, blemishes, and pest presence in the group of plants in the module based on the set of features; and then calculate viability of the group of plants (e.g., a single viability score for the group of plants) in the module as a function of sizes, as an inverse function of blemishes, and as an inverse function of pest presence in the group of plants in the module. In this example, if the viability (e.g., the single viability score) for the module exceeds a preset threshold value, the system 100 can authorize transfer of plants out of the module (and into a next module or into a harvest container, etc.).

However, the system 100 can qualify or quantity viability, quality, health, etc. of plants in a module in any other way and according to any other schema prior to authorizing the robotic manipulator to move plants out of the module.

5.7 Sequential Plant Transfer

During a transfer cycle, the robotic manipulator can: navigate to an initial retrieval position over the first module docking location; detect a first optical fiducial on the first module in the field of view of the optical sensor on the robotic manipulator; register motion of the end effector to this first optical fiducial; navigate to a first plant slot in the first module to engage the first plant; retract the end effector vertically upward from the first module to draw the first plant and its roots out of the first plant slot; move the end effector to an initial deposit position over the second module docking location; detect an second optical fiducial on the second module in the field of view of the optical sensor; register motion of the end effector to this second optical fiducial; navigate to over a last plant slot in the second module; advance the end effector vertically downward to insert the first plant into the last plant slot in the second module; and then retract the end effector back to the initial retrieval position over the first module docking location in Block S130. The robotic manipulator can then repeat this process in Block S130: to move a second plant in a second plant slot in the first module to a second-to-last plant slot in the second module; to move a third plant in a third plant slot in the first module to a third-to-last plant slot in the second module; etc. until the second module is full or until the first module is empty.

Therefore, the system 100 can: record a first optical scan of the first module at the first transfer station; extract a first set of features from the first optical scan; estimate viability of a first set of plants occupying the first module based on the first set of features; authorize transfer of the first set of plants from the first module in response to viability of the first set of plants exceeding a threshold viability; and then— at the robotic manipulator at the transfer station—sequentially transfer the first subset of plants from the first module into a second array of plant slots in a second module in Block S130.

In one variation, the robotic manipulator can also scan an individual plant while approaching the plant from the initial retrieval position or insert the plant into an optical inspection station after retrieving the plant from the first module and before inserting the plant into the second module. The system 100 can then implement methods and techniques similar to those described above to extract plant-specific data (e.g., a plant viability) from these additional plant-specific scan data. However, the system 100 can implement any other methods or techniques to check viability of plants in modules located at a transfer station and to handle these plants accordingly in Block S130.

6. Cleaning Station

One variation of the method S100 shown in FIG. 4 further includes Block S140, which recites, prior to delivering the first module to a transfer station to receive a next set of plants, delivering the first module to a cleaning station within the facility. In this variation, the loader can deliver the first module to a transfer station to receive its next set of plants in Block S114 following completion of a clean cycle with the first module at the cleaning station. Generally, in this variation, the computer system can generate (or surface)

a module cleaning order specifying delivery of a target module to a cleaning station within the facility for cleaning; and the loader can deliver the target module to a cleaning station in the facility for removal of plant matter and/or sterilization prior to delivering the target module to a transfer station for loading with a next set of plants.

In one implementation, the computer system: tracks an amount of time or a number of plant transfer cycles occurring at a target module since the target module was last cleaned; and then issues a module cleaning order to the target module once a threshold amount of time (e.g., eight weeks) since the module was last cleaned is reached or once a threshold number of plant transfer cycles (e.g., four) has transpired since the target module was last cleaned. Once the target module is emptied of plants, as described above, the loader can thus autonomously: navigate to the target module; engage the target module; autonomously navigate to the cleaning station in the facility; deposit the target module in the cleaning station; retrieve the target module upon conclusion of a cleaning cycle at the cleaning state; and then deliver the target module back to a transfer station in the facility to receive a next set of plants.

The computer system can additionally or alternatively issue a module cleaning order for a target module if excess plant matter is detected in the target module following removal of plants from this target module. For example, the robotic manipulator at a transfer station can include a camera mounted to or integrated into its end effector; once the robotic manipulator empties the target module of plants, the robotic manipulator can record an optical scan of the target module through the camera and return this optical scan to the computer system. The computer system can then implement computer vision techniques to correlate dark (e.g., brown) area within and around plant slots in the hydroponic trays in the target module with remaining plant matter and then issue a module cleaning order if the amount of such excess plant matter exceeds a preset threshold. Alternatively, once the target module is emptied of plants, the loader can return to the transfer station to collect the target module according to a module transport order received from the computer system; upon collecting the target module, the loader can sample an integrated scale or other integrated weight sensor to determine the weight of the target module and then return this weight to the computer system. If this weight exceeds a threshold weight—corresponding to a threshold amount of allowable plant matter remaining in a module prior to receipt of a new group of plants—the computer system can issue a module cleaning order for the target module and immediately return this module cleaning order to the loader.

In the implementation described above in which the robotic manipulator generates an optic scan of the target module following removal of all plants from the target module, the computer system can implement computer vision techniques to detect pollution or contamination of the target module. For example, the computer system can detect black or brown spots on white hydroponic trays, correlate such spots with mold or mildew, generate a module cleaning order for the target module accordingly; and immediately deliver the module cleaning order to the loader.

The computer system, robotic manipulator, and/or loader can also implement any of the forgoing methods and technique upon delivery of the target module to a transfer station. However, the computer system can issue a module cleaning order in response to any other trigger.

For example, the loader can deliver a first module—defining a first array of plant slots at a first density and loaded with a first set of plants in approximately a second growth stage (e.g., a nursery-type module loaded with a first set of plants in approximately a finishing stage)—to the first transfer station in Block S112. The loader can also deliver a second module—defining a second array of plant slots at a second density less than the first density and loaded with a second set of plants in approximately a third growth stage succeeding the second growth stage (e.g., finishing-type module loaded with the third set of plants in approximately a harvest stage)—to the first transfer station in Block S122. The loader can also: deliver the second module from the first transfer station to a cleaning station within the facility, as described below, in response to the robotic manipulator emptying the second set of plants from the second module; and then return the second module to the first transfer station following completion of a clean cycle with the second module at the cleaning station in Block S140.

The robotic manipulator at the first transfer station can then: transfer the second set of plants out of the second module (e.g., into a harvest container); and then transfer a first subset of plants from the first array of plant slots in the first module into the second array of plant slots in the second module once the second set of plants is emptied from the second module in Block S130. For example, the robotic manipulator can sequentially transfer a first subset of plants from the first module into the second array of plant slots in the second module in response to the loader returning the second module to the first transfer station.

The loader can then: navigate to a third module located within the facility and defining a third array of plant slots at the second density; deliver the third module to the first transfer station; replace the second module with the third module at the first transfer station in response to the robotic manipulator transferring a first subset of plants from the first module into the second array of plant slots in the second module to fill the second module; and return the second module to its assigned grow location in the facility. Once the first set of plants in the first module is transferred out of the first module, the loader can similarly: deliver the first module to the cleaning station for cleaning; return the first module to the first transfer station or to another transfer station in the facility to receive a next set of plants in approximately a sprout stage; and then return the first module to its assigned grow area within the facility following insertion of this next set of plants into the first module.

7. Quarantine

As shown in FIG. 4, another variation of the method S100 includes Block S150, which recites: accessing a first optical scan of the first module; extracting a first set of features from the first optical scan; detecting pest presence in the first module based on the first set of features; rejecting transfer of the first set of plants from the first module and queuing the first module for quarantine in response to detecting pest presence in the first module; and—at the mobile robotic system—delivering the first module to a quarantine location within the facility. Generally, in this variation, the computer system can issue a module quarantine order for a target module in response to detection of a pest or signs of pest pressure in a module.

In one implementation, when the first module containing a group of plants is delivered to a transfer station, the robotic manipulator at the transfer station can record an optical scan of the first module, as described above. Upon receipt of the optical scan, the computer system can implement computer vision techniques to detect pests or signs of pests within the group of plants in the first module. For example, the computer system can analyze the optical scan for dark (e.g., black or brown) round or lozenge-shaped spots that may indicate the presence of insects (e.g., ants, aphids, flies, silverfish, moths, or caterpillars, etc.) on plants within the first module. In this example, the computer system can maintain a counter of such spots, pass the group of plants in the first module for transfer to the second module if the final value of this counter remains below a threshold value (e.g., "5"), and fail the group of plants in the first module (e.g., flag the first module for quarantine) if the final value of this counter exceeds the threshold value. Furthermore, the computer system can record multiple optical scans of the first module over a period of time (e.g., five seconds), repeat the foregoing methods and techniques to identify such spots in each optical scan, implement object tracking techniques to track motion of these spots across these optical scans, confirm that these spots represent insects if these spots are determined to have moved throughout the sequence of optical scans, and then fail the first module accordingly. The computer system can implement similar methods and techniques to detect parasites (e.g., chiggers, ticks, or mites) and/or gastropods (e.g., slugs) on leafy regions of plants shown in the optical scan.

In another example, the computer system scans the optical scan for dark, discolored leaf regions that may indicate a nematode infestation. In this example, if the computer system detects any such dark, discolored leaf region in the first module or calculates that a threshold proportion of the leaf area in the first module is so discolored, the computer system can fail the first module and flag the first module and its contents for quarantine. However, the computer system can implement any other methods or techniques to detect pests directly or to infer the presence of pests in plants in the first module from color data contained in one or a sequence of optical scans of the first module.

Once a pest or signs of pest pressure are thus detected in the first module, the computer system can issue a module quarantine order specifying removal of the first module to an isolated quarantine area in the facility and immediately serve this module quarantine order to the loader. Upon receipt of the module quarantine order, the loader can cease execution of a current module transport order and immediately transition to executing the module quarantine order to deliver the first module from the transfer station to the isolated quarantine area. Following completion of the module quarantine order and before returning to its last module transport order, the loader can pass through a sanitization station adjacent the isolated quarantine area, such as a bleach or steam spray.

The computer system can therefore disrupt operation of the loader in order to quickly remove a target module exhibiting signs of pest pressure to an isolated quarantine area in the facility. The computer system can also issue a module replacement order specifying retrieval of a new module to replace the quarantined first module and can serve this module replacement order to the loader upon completion of the module quarantine order. The loader can then retrieve a new module from a holding area in the facility and insert this new module into rotation on the floor of the facility according to this module replacement order.

However, the computer system can detect a pest or signs of pest pressure in a module and can trigger the loader to quarantine this module in any other way.

8. Repair and Replace

In a similar variation shown in FIG. 4, the computer system can detect signs of a faulty or defective module based on data extracted from an optical scan of the module and then issue a module replacement order specifying replacement of the module with another module.

In one implementation, the computer system implements template matching or object recognition techniques to identify leaves in an optical scan of the first module, such as based on template images or models of leaves of plants of the same type and at similar growth stages as the group of plants in the first module. The computer system can then correlate light-colored (e.g., yellow, tan, brown) regions around perimeters of these leaves with chemical burns or insufficient nutrient supply and then flag the first module for replacement accordingly. For example, the computer system can first send to the loader a module discard order specifying delivery of the first module to a discard station; once this module discard order is completed, the computer system can send to the loader a module replacement order specifying retrieval of a replacement (e.g., a new or refurbished) module from a holding area in the facility. The computer system can also issue a prompt to a human operator or technician in the building to manually investigate and/or repair the first module upon receipt of the first module at the discard station.

Alternatively, in the foregoing example, the computer system can: determine, based on chemical burns or poor nutrient indicators identified in the optical scan, that the first module is malfunctioning; trigger the loader to bring a second module of the same type as the first module to the transfer station; trigger the robotic manipulator to transfer all plants (or all salvageable plants) from the first module to the second module; trigger the loader to deliver the first module to the discard station; and trigger the loader to deliver the second module to a recovery area within the facility at which these plants may recover from these chemical burns or nutrient deficiency, such as under lower-intensity lighting and temperature conditions.

The computer system can implement similar methods and techniques to trigger the loader to replace the first module with another module if sensor or systems data received from the first module indicates that the first module has: a malfunctioning pump; a malfunctioning sensor suite; a low or empty water reservoir; a low or empty nutrient reservoir; a low battery state of charge; etc.

However, the computer system can serve a module discard order and/or a module replacement order to the loader in response to any other event or trigger.

9. Plant Prediction and Handling

Figure 9:
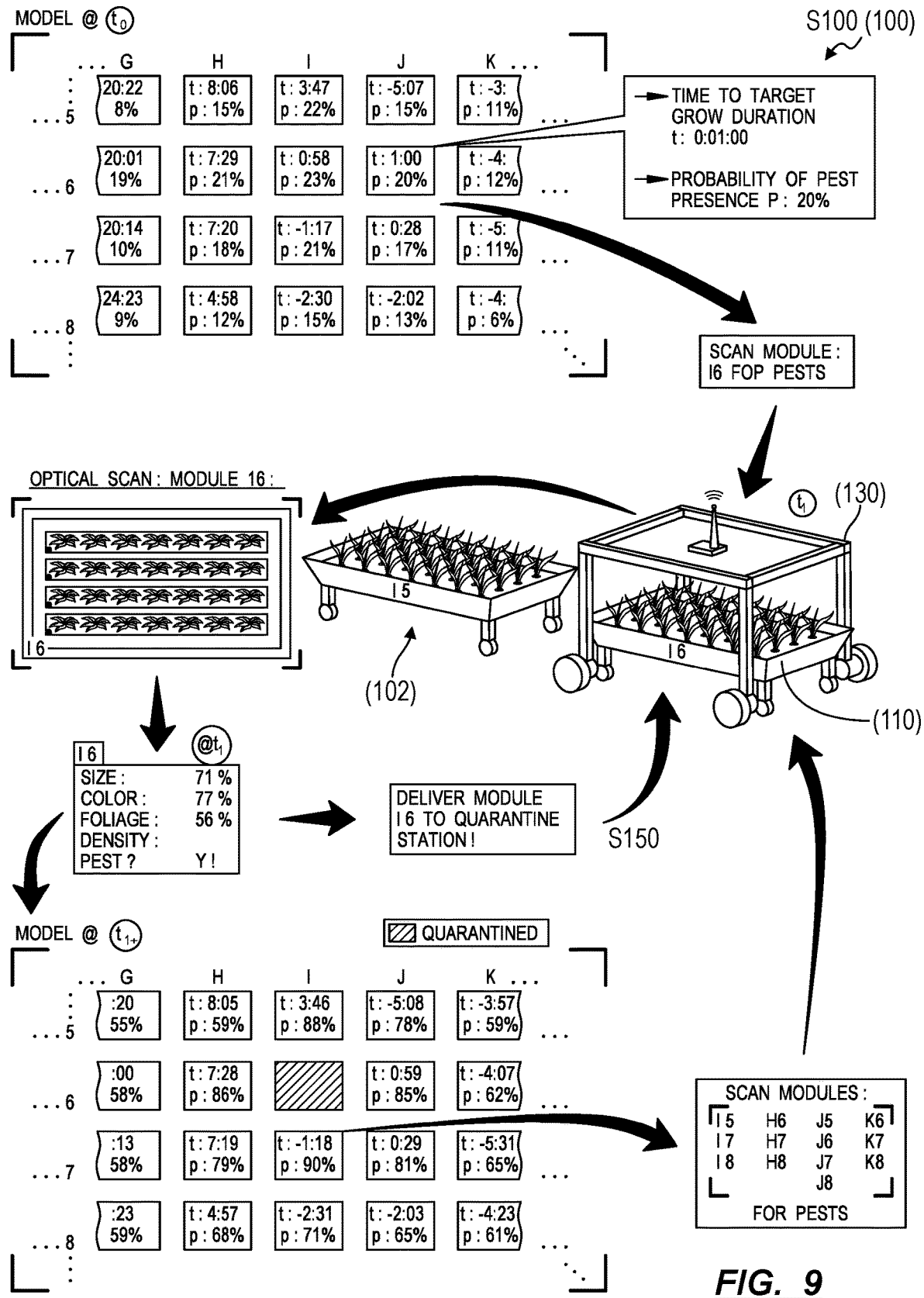
FIG. 9 is a flowchart representation of one variation of the method.

In one variation shown in FIGS. 6 and 9, the system 100 can maintain a virtual model (or profile, map, etc.) representing states of substantially all plants throughout the facility at any instance in time based on: viability data (e.g., size, color, foliage density, chemical burns, nutrient deficiency, and/or pest presence, etc.) extracted from optical scans of a subset of these plants; and known positions of these plants throughout the facility. In particular, because plants in modules in close physical proximity in the facility may exhibit similar growth characteristics and pest pressures and because plants in more physically remote modules in the facility may exhibit looser growth and pest pressure similarities, the system 100 can predict states of other modules and plants throughout the facility and represent these predictions in a virtual model of the facility based on: data extracted from optical scans of a small subset of modules delivered to one or more transfer stations in the facility within a period of time (e.g., the current minute, hour, or day); last grow locations of this small subset of modules; and proximity of other modules to these grow locations. The system 100 can then update rankings for transferring plants from modules throughout the facility, issue immediate commands to the loader to move modules to the quarantine station, dispatch the loader to deliver modules to a transfer station for further (optical) testing, and/or dispatch the loader to deliver modules to alternative grow locations in the facility, etc. based on module and plant predictions represented in the virtual model of the facility.

As described above, once the loader delivers a first module containing a first group of plants from a first grow location to a first transfer station in the facility, a robotic manipulator at the first transfer station can record an optical scan of the first module, record optical scans of each individual plant in the first module, and/or sequentially place each plant in the first module into an optical inspection station for recordation of high-resolution optical scans of these plants. The system 100 can then extract viability-related data from optical scans, such as: whether plants in the first module are generally ready for transfer to a next module or for harvest; whether plants in the first module exhibit geometries that fall within size and geometry specifications for plants in this growth stage; whether plants in the first module exhibit chemical or sun burns; whether plants in the first module exhibit signs of nutrient deficiency; or whether pests or indicators of pests are present in the first module or in plants in the first module. The system 100 can then extrapolate size, color, foliage density, chemical burns, nutrient deficiency, and/or pest pressure, etc. in a second module currently located in a second grow location in the facility according to such qualities of plants in the first module, weighted according to proximity of the first grow location—most-recently occupied by the first module—to the second location of the second module.

As the loader delivers additional modules to the first transfer station, the robotic manipulator can again record optical scans of these modules and their plants, and the system 100 can extract similar plant viability data from these optical scans. As these additional plant viability data become available, the system 100 can interpolate plant viabilities in any other module throughout the facility based on: these additional plant viability data; last known grow locations of these scanned modules; and grow locations currently occupied by these other modules that have not yet been scanned or not recently scanned.

Therefore, the system 100 can: interpolate and/or extrapolate viabilities of groups of plants in modules throughout the facility based on proximity to a subset of modules recently scanned (e.g., at the transfer station or by the loader) and viabilities of groups of plants in this subset of modules; and then update a virtual model with estimated viabilities of groups of plants in modules throughout the facility.

9.1 Sufficient Viability Predicted

In one implementation, the system 100 can reorder a queue of modules for delivery to the transfer station for transfer of plants to a next module or to a harvest container based on the virtual model.

For example, the loader can deliver a first module from a first grow location in the grow area within the facility to the first transfer station; and the robotic manipulator at the first transfer station can record a first optical scan of the first module. The system 100 can then implement methods and techniques described above to: characterize viability of plants in the first module based on the first optical scan; and then predict viability of a second set of plants—currently stored in a second array of plant slots in a second module located in a second grow location adjacent the first grow location within the facility and of the same plant type and of ages similar to those of the first set of plants in the first module—based on viability of the first set of plants and proximity of the first grow location to the second grow location. In particular, once the first module previously located in the first grow location in the facility is scanned and its plants thus characterized, the system 100 can prioritize prediction of viabilities of plants in modules immediately adjacent the first grow location, since strength of correlation between viabilities of plants in distinct modules may be a function of physical distance between these modules. In this example, in response to the predicted viability of the second set of plants in the second module thus exceeding a preset threshold viability, such as described above, the system 100 can queue the second module for delivery to the first transfer station. The loader can thus autonomously deliver the second module to the transfer station soon thereafter, such as once the first module is emptied, refilled with another set of plants, and then returned to the same or other grow location within the facility.

Therefore, since plants in the first module were determined to be of sufficient viability in light of features extracted from the first optical scan of the first module and given recent physical proximity of the second module to the first module, the system 100 can: project viability of plants in the first module to the location of the second module to predict that plants in the second module are similarly viable. The loader can then navigate to the second module (e.g., in response to returning the first module back to the grow area and deliver the second module to the first transfer station accordingly.

Similarly, if the system 100 determines from the first optical scan that plants in the first module are not (yet) viable, the system 100 can predict that plants in the second module are also not (yet) viable and deprioritize transfer of the second module to the transfer station by the loader.

9.2 Module Clusters

Furthermore, the system 100 can assign modules of the same type and containing the same types of plants that were loaded into the modules at approximately the same time (e.g., on the same date) to a cluster of physically-adjacent grow locations within the grow area of the facility. As the target grow time for plants in these modules nears or is reached (e.g., four weeks since these modules were loaded with these plants), the system 100 can dispatch the loader to retrieve a first module characteristic of this cluster of modules, such as arranged near a physical center of this cluster of modules. Once this first module is scanned at the transfer station and viabilities of these plants thus determined, the system 100 can implement methods and techniques described above to extrapolate viabilities of plants in other modules in this cluster. If the system 100 determines very low viability of plants in the first module and thus predicts that plants in other modules in this cluster exhibit similarly low viability, the system 100 can queue the loader to return the first module to this cluster and then move on to scanning a different cluster of modules in the facility. However, if the system 100 determines sufficient or nearly-sufficient viability of plants in the first module and thus predicts that plants in other modules in this cluster exhibit similarly sufficient or nearly-sufficient viability, the system 100 can queue the loader to deliver another module from this cluster to the transfer station for scanning; as additional viability data of plants in modules in this cluster are thus collected, the system 100 can further revise its prediction of viabilities of other plants in this cluster, such as shown in FIG. 9.

The system 100 can further project these plant viabilities to nearby clusters of modules containing older and/or younger plants, thereby expanding plant viability to many more modules throughout the facility based on these limited, single-module data recorded at the transfer station.

For example, for each module in the grow area in the facility, the system 100 can calculate a rank for the module based on temporal proximity of a time since plants were last loaded into the module and a target grow duration associated with a type of the module (i.e., based on a plant slot density of the module). Specifically, the system 100 can rank each module in the facility by whether plants in the module have reached a target age or based on whether a target time has past since the module was last loaded with plants. The system 100 can then dispatch the loader to deliver a first module of a first type (e.g., a nursery type) to the first transfer station in response to a first rank of the first module exceeding ranks of other modules of the first type in the facility, wherein the first module is representative of (e.g., physically centered within a cluster of) like modules of the same type and assigned similar or identical ranks. The system 100 can then: elevate a rank of a second module—also of the first type, loaded with plants of ages and types similar to those of the first module, and recently located (immediately) adjacent the first module—over other modules of the first type in the facility in response to determined viability of plants in the first module exceeding a preset threshold viability (which, as described above, may suggest that plants in the second module may similarly exhibit viability greater than the threshold viability); and vice versa.

The system 100 can implement similar methods and techniques to dispatch the loader to deliver a third module of a second type (e.g., a finishing type) to the first transfer station in response to a third rank of the third module exceeding ranks of other modules of the second type in the facility, wherein the third module is similarly representative of (e.g., physically centered within a cluster of) like modules of the same type and assigned similar or identical ranks.

9.4 Pest Pressure

The system 100 can implement similar methods and techniques to: maintain a virtual model of probability of pest presence in modules throughout the facility; and to update this model by interpolating or extrapolating presence or absence of pests or pest indicators detected in a first optical scan of plants in a first module to other modules and plants throughout the facility based on proximity to the last grow location of the first module. The system 100 can then selectively queue the loader to deliver modules directly to the quarantine station or to the transfer station for further analysis based on probability of pest presence in these modules indicated in the virtual model, as shown in FIG. 9.

For example, the system 100 can identify a first module that exhibits a greatest probability of pest presence—exceeding a threshold probability (e.g., 35%)—according to the virtual model and then queue the loader to immediately deliver this first module to the transfer station. (In a similar example, the system 100 can identify a first module that exhibits a greatest probability of pest presence according to the virtual model and then queue the loader to deliver this first module to the transfer station, such as when the loader is idle or once the loader has completed all assigned tasks, regardless of the probability of pest presence indicated for the first module by the virtual model.) In this example, the loader can then navigate to the first module located in a first grow location in the grow area within the facility in Block S110 and then deliver the first module to the transfer station in Block S112. The mobile robotic system can then record a first optical scan of the first module through an optical sensor integrated into the mobile robotic system in response to arriving at the first module at the first grow location. The system 100 can then implement methods and techniques described above to process the first optical scan for indicators of pest presence. In response to detecting pest presence in the first module, the system 100 can: implement methods described above to predict pest presence (e.g., interpolate or extrapolate probability of pest presence) in a second module located in a second grow location adjacent the first grow location in the grow area within the facility based on pest presence in the first module and proximity of the first grow location to the second grow location. In particular, the system 100 can calculate an increased probability of pest presence in the second module given presence of pests or pest indicators in the first module—similarly calculate a decreased probability of pest presence in the second module given lack of presence of pests or pest indicators in the first module—as a function of (i.e., weighted according to) physical distance between the first and second grow locations of the first and second modules, respectively.

In response to predicting pest presence in the second module—that is, in response to the updated probability of pest presence in the second module exceeding a threshold probability—the system 100 can queue the second module for further analysis. Accordingly, the loader can autonomously navigate to the second module located in the second grow location and deliver the second module to the transfer station, which can then record a second optical scan of the second module. (Alternatively, in the variation of the loader that includes an integrated optical sensor, the loader can autonomously navigate to the second grow location and then record a second optical scan of the second module upon arriving at the second module.)

The system 100 can then extract a second set of features from the second optical scan; confirm pest presence in the second module based on the second set of features; and queue the second module for quarantine in response to confirming pest presence in the second module. The loader can then immediately transfer the second module from the transfer station (or from the second grow location) directly to the quarantine location. Otherwise, if no pests or pest indicators are detected in the second optical scan, the system 100 can queue the loader to return the second module to the second grow location and then update the virtual model accordingly.

The system 100 can repeat these processes: to collect pest pressure data from other select modules throughout the facility; to update the virtual model accordingly; and to selectively queue modules for immediate delivery to the quarantine station (i.e., to prevent further spread of pests) or for delivery to a transfer station for collection of further data and subsequent analysis.

10. Loader Scans

In one variation shown in FIG. 9, the loader further includes an optical sensor defining a field of view configured to encompass the width and length of a module when the loader is engaged to or otherwise arranged over the module. In this variation, the loader can record optical scans of modules while navigating throughout the facility, such as while the loader navigates past a series of modules on its way to a target module or once the loader reaches a target module and before delivering the target module to a transfer station elsewhere in the facility.

In one implementation, the loader records optical scans of modules predicted to exhibit low viability (e.g., young, undersized) and/or characterized by increased probability of pest presence by the virtual model, such as when the loader is idle or while the loader autonomously navigates to a target module scheduled for delivery to a transfer station. As the loader records these optical scans, the system 100 can: associate each optical scan with an unique module, such as based on the location of the loader within the facility when an optical scan was recorded or based on an unique identifier read from a surface of a module detected in the optical scan; extract features from each optical scan; correlate these features with sizes, colors, foliage densities, chemical burns, nutrient deficiencies, pest presence, and/or characteristics of plants in these modules; and then update the virtual model accordingly based on known locations of these modules.

For example, the system 100 can: maintain a virtual model of locations of a corpus of modules arranged throughout the grow area within the facility and the last measured and/or predicted characteristics of plants in these modules; identify a subset of modules—in the corpus of modules—that contain groups of plants predicted to exhibit low viability; and dispatch the loader to record optical scans of these modules. The loader can then: sequentially navigate to modules in this subset of modules; and, for each module in the subset of modules, record an optical scan of the module through an optical sensor integrated into the mobile robotic system. Finally, for each module in the subset of modules, the system 100 can characterize viability of a group of plants in the module based on features detected in the optical scan of the module and then update the virtual model with viabilities of groups of plants in this subset of modules accordingly.

The system 100 can similarly queue the loader to record optical scans of modules containing high-viability plants (or queue the loader to deliver such modules to a transfer station for further analysis) and update the virtual model of modules throughout the facility accordingly.

The system 100 can thus: predict plant viabilities and probabilities of pest presence in modules throughout the facility based on data collected from other modules; selectively dispatch the loader to collect additional optical data from modules that exhibit particularly low and/or particularly high plant viabilities and probabilities of pest presence; extract measured viability and pest presence characteristics from these optical data; and update the virtual model accordingly, thereby reducing drift and enabling the virtual model to present a more accurate, real-time representation of states of plants in modules throughout the facility. The system 100 can also implement machine learning or other regression techniques to refine coefficients or other parameters for interpolating or extrapolating plant viabilities and probabilities of pest presence in the model as a function of distance between modules and plant viability and pest presence extracted from optical scans of a limited number of modules.

10.1 Passive Scan Mode

In this variation, the loader can therefore record optical scans of modules throughout the grow area of the facility, such as specifically when in an idle or "passive scan" mode.

For example, the loader can: deliver a first module to the first transfer station in response to a time since a first set of plants were loaded into the first module exceeding a target grow duration associated with a type of the first module; and repeat this process for other modules in the facility as their target grow times expire. However, if a time since plants were loaded into a module in the facility is less than a target grow duration associated with the module for each module in the facility, the computer system can trigger the loader to enter a passive scan mode—that is, if all modules have not yet reached their target grow durations, the loader can enter a passive scan mode. In the passive scan mode, the loader can sequentially navigate to modules in a subset of modules containing groups of plants predicted to exhibit low viability and/or high probability of pest presence. The system 100 can then extract plant characteristics from these optical scans and update the virtual model of plants throughout the facility accordingly, as described above.

The system 100s and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for automatically redistributing plants throughout an agricultural facility comprising, at a mobile robotic system:

delivering a first module located in a grow area within the agricultural facility, to a first transfer station within the agricultural facility, the first module defining a first array of plant slots at a first density and loaded with a first set of plants in approximately a second growth stage;

delivering a second module to the first transfer station, the second module defining a second array of plant slots at a second density less than the first density and empty of plants;

delivering a third module to the first transfer station, the third module defining a third array of plant slots at the second density;

following a transfer of a first subset of plants, in the first set of plants, from the first array of plant slots in the first module into the second array of plant slots in the second module at the first transfer station, delivering the second module to the grow area in the agricultural facility; and following transfer of a second subset of plants, in the first set of plants, from the first array of plant slots in the first module into the third array of plant slots in the third module at the first transfer station, delivering the third module to the grow area in the agricultural facility.

2. The method of claim 1 further comprising, by the mobile robotic system:

in response to removal of the first set of plants from the first array of plant slots in the first module, delivering the first module to a second transfer station within the agricultural facility; and in response to insertion of the second set of plants into the first array of plant slots in the first module at the second transfer station, returning the first module to the grow area within the agricultural facility wherein, the second set of plants are in approximately a first growth stage preceding the second growth stage.

3. The method of claim 1, wherein delivering the third module to the first transfer station comprises, in response to transferring the first subset of plants from the first array of plants slots in the first module into the second array of plant slots in the second module replacing, by the mobile robotic system, the second module with the third module at the first transfer station.

4. The method of claim 1, further comprising:
accessing a first optical scan of the first module;
extracting a first set of features from the first optical scan;
detecting pest presence in the first module based on the first set of features;
in response to detecting pest presence in the first module:
rejecting transfer of the first set of plants from the first module; and
queuing the first module for quarantine; and
delivering, by the mobile robotic system, the first module to a quarantine location within the agricultural facility.

5. The method of claim 4:
wherein delivering the first module comprises delivering the first module located in a first grow location in the grow area within the agricultural facility; and
further comprising recording, by the mobile robotic system, the first optical scan of the first module through an optical sensor integrated into the mobile robotic system in response to arriving at the first module in the first grow location.

6. The method of claim 1, wherein delivering the first module to the transfer station comprises, by the mobile robotic system:
navigating to a first grow location, within the grow area, assigned to the first module;
capturing an optical image of the first grow location;
detecting an optical fiducial on the first module in the optical image;
physically aligning to the first module based on the optical fiducial; and
elevating the first module off of the first grow location.

7. The method of claim 1:
further comprising, by the mobile robotic system, delivering the first module to a stall within the agricultural facility at a first time, the first module loaded with the first set of plants in approximately a first growth stage preceding the second growth stage at the first time; and
at a second time following infusion of nutrients from a reservoir into the first module occupying the stall, delivering the first module to the grow area within the agricultural facility.

8. A method for automatically redistributing plants throughout an agricultural facility comprising:
by a mobile robotic system:
at a first time, navigating to a first module located within the agricultural facility, the first module defining a first array of plant slots at a first density and loaded with a first set of plants in approximately a first growth stage at the first time; and
delivering the first module to a first location within the agricultural facility;
by a central pump coupled to the first location:
pumping nutrients from a reservoir into the first module;
by the mobile robotic system:
a second time, navigating to the first module located within the agricultural facility, the first module loaded with the first set of plants in approximately a second growth stage at the second time; and
delivering the first module to a transfer station within the agricultural facility; and
by a robotic manipulator at the transfer station:
transferring the first set of plants out of the first module.

9. The method of claim 8:
further comprising, by the mobile robotic system:
navigating to a second module located within the agricultural facility, the second module defining a second array of plant slots at a second density less than the first density and empty of plants;
delivering the second module to the transfer station;
wherein transferring the first set of plants out of the first module comprises, by the robotic manipulator, transferring a first subset of plants from the first array of plant slots in the first module into the second array of plant slots in the second module; and
by the mobile robotic system, delivering the second module, containing the first subset of plants, to a first grow area.

10. The method of claim 8:
further comprising, by the mobile robotic system:
navigating to a third module located within the agricultural facility, the third module defining a third array of plant slots at a second density and empty of plants; and
delivering the third module to the transfer station;
wherein transferring the first set of plants out of the first module comprises, by the robotic manipulator, following transfer of a first subset of plants from the first module into the second module, transferring a second subset of plants from the first array of plant slots in the first module into the third array of plant slots in the third module; and
by the mobile robotic system, delivering the third module, occupied by the second subset of plants, to a first grow area.

11. The method of claim 8, wherein delivering the first module to the transfer station comprises, by the mobile robotic system, delivering the first module to a conveyor at the transfer station.

12. The method of claim 8:
further comprising:
recording a first optical scan of the first module;
extracting a first set of features from the first optical scan;
estimating a first viability of the first set of plants based on the first set of features; and
in response to the first viability of the first set of plants exceeding a threshold viability, authorizing transfer of the first set of plants out of the first module; and
wherein transferring the first set of plants out of the first module comprises, by the robotic manipulator, transferring a first subset of plants out of the first module, occupying the transfer station, in response to authorization of transfer of the first set of plants out of the first module.

13. The method of claim 12:
wherein navigating the first module at the second time comprises, by the mobile robotic system, navigating to the first module located in a first grow location in a grow area within the agricultural facility at the second time;

further comprising, by the mobile robotic system, recording the first optical scan of the first module through an optical sensor integrated into the mobile robotic system in response to arriving at the first module in the first grow location; and wherein delivering the first module to the transfer station comprises, by the mobile robotic system, delivering the first module to the transfer station in response to authorization of transfer of the first set of plants out of the first module.

14. The method of claim 12:

wherein navigating to the first module comprises retrieving the first module from a first grow location in a grow area within the agricultural facility; and further comprising:

predicting a second viability of a second set of plants in a second array of plant slots in a second module located in a second grow location adjacent the first grow location within the agricultural facility based on the first viability of the first set of plants and proximity of the first grow location to the second grow location;

in response to the second viability of the second set of plants exceeding the threshold viability, queuing the second module for delivery to the transfer station; and delivering, by the mobile robotic system, the second module to the transfer station in response to returning the first module to a grow area.

15. A method for automatically redistributing plants throughout an agricultural facility comprising, by a mobile robotic system:

at a first time, delivering a first module to a stall within the agricultural facility, the first module defining a first array of plant slots at a first density and loaded with a first set of plants in approximately a first growth stage at the first time;

at a second time, following infusion of nutrients from a reservoir into the first module occupying the stall, delivering the first module to a first grow area within the agricultural facility;

at a third time, succeeding the second time, delivering the first module to a transfer station within the agricultural facility, the first module loaded with the first set of plants in approximately a second growth stage at the second time; and following removal of the first set of plants from the first array of plant slots in the first module and insertion of a second set of plants into the first array of plant slots in the first module, returning the first module to the first grow area within the agricultural facility, the second set of plants in approximately the first growth stage.

16. The method of claim 15:

wherein delivering the first module to the stall within the agricultural facility comprises, by the mobile robotic system, delivering the first module to the stall to facilitate growth of the first set of plants from the first growth stage to a third growth stage, the stall located in a second grow area within the agricultural facility and comprising a fluid supply coupled to the reservoir via a pump and configured to dispense nutrients from the reservoir into the first module; and wherein delivering the first module to the first grow area comprises, by the mobile robotic system, delivering the first module to the first grow area to facilitate growth of the first set of plants from the third growth stage to the second growth stage.

17. The method of claim 15, wherein delivering the first module to the stall within the agricultural facility comprises, by the mobile robotic system:

navigating the first module to the stall;

aligning an inlet coupler arranged on the first module to a supply socket fluidly coupled to the reservoir; and advancing the first module into the stall to engage the inlet coupler to the supply socket.

18. The method of claim 15:

further comprising, by the mobile robotic system:

at a fourth time following removal of the first set of plants from the first array of plant slots in the first module, delivering the first module to a cleaning station within the agricultural facility;

a fifth time following cleaning of the first module at the cleaning station, returning the first module, empty of plants, to the transfer station for insertion of the second set of plants into the first array of plant slots in the first module; and at a sixth time following insertion of the second set of plants into the first array of plant slots in the first module, delivering a first module to the stall; and wherein returning the first module to the first grow area within the agricultural facility comprises, by the mobile robotic system, returning the first module to the first grow area within the agricultural facility further following infusion of nutrients from the reservoir into the first module occupying the stall.

19. The method of claim 15, further comprising, by the mobile robotic system:

delivering a second module to the transfer station, the second module defining a second array of plant slots at a second density less than the first density and empty of plants; and following insertion of a first subset of plants in the first set of plants from the first array of plant slots in the first module into the second array of plant slots in the second module, returning the second module to the first grow area.

20. The method of claim 19:

further comprising, by the mobile robotic system, following insertion of a first subset of plants in the first set of plants from the first array of plant slots in the first module into the second array of plant slots in the second module, delivering the second module to the stall; and wherein returning the second module to the first grow area comprises, by the mobile robotic system, returning the second module to the first grow area following infusion of nutrients from the reservoir into the first module occupying the stall.

\* \* \* \* \*